US012660837B1

(12) United States Patent
Tuchrelo et al.

(10) Patent No.: US 12,660,837 B1
(45) Date of Patent: Jun. 23, 2026

(54) AUTOMATED CLEAN-IN-PLACE APPARATUS AND METHOD

(71) Applicant: Clean Safer Systems, LLC, Victor, NY (US)

(72) Inventors: Robert Tuchrelo, Williamson, NY (US); Nathan E. Smith, Hamlin, NY (US); Richard T. Aab, Fairport, NY (US)

(73) Assignee: Clean Safer Systems, LLC, Victor, NY (US)

( * ) Notice: Subject to any disclaimer, the term of this patent is extended or adjusted under 35 U.S.C. 154(b) by 0 days.

(21) Appl. No.: 19/303,878

(22) Filed: Aug. 19, 2025

Related U.S. Application Data

(60) Provisional application No. 63/820,864, filed on Jun. 10, 2025.

(51) Int. Cl.
| | |
|---|---|
| *A23G 9/30* | (2006.01) |
| *A47J 31/06* | (2006.01) |
| *A47J 31/56* | (2006.01) |
| *B08B 9/032* | (2006.01) |
| *A23G 9/08* | (2006.01) |

(52) U.S. Cl.
CPC .............. *A23G 9/30* (2013.01); *B08B 9/0325* (2013.01); *A23G 9/08* (2013.01)

(58) Field of Classification Search
CPC ........... A23G 9/30; A23G 9/08; B08B 9/0325
See application file for complete search history.

(56) References Cited

U.S. PATENT DOCUMENTS

| | | | |
|---|---|---|---|
| 4,201,558 | A | 5/1980 | Schwitters et al. |
| 4,703,628 | A | 11/1987 | Togashi et al. |
| 4,848,381 | A | 7/1989 | Livingston et al. |
| 4,860,550 | A | 8/1989 | Aoki et al. |

(Continued)

FOREIGN PATENT DOCUMENTS

| | | |
|---|---|---|
| JP | S 49-093578 A | 9/1974 |
| JP | S 53-043086 U | 4/1978 |

(Continued)

OTHER PUBLICATIONS

Prince, "Prince Control Valve", 4-way, 3 Piston Cylinder Spool; retrieved from https://www.amazon.com/Prince-Control-Valve-3-Position -Cylinder/dp/B0000AX2UL (Year: 2011).

(Continued)

*Primary Examiner* — Edward F Landrum
*Assistant Examiner* — Kuangyue Chen
(74) *Attorney, Agent, or Firm* — Harter Secrest & Emery LLP; Douglas R. Smith

(57) ABSTRACT

A food processor having a food flow path extending from a food flow path input to a food flow path output. Food product passes in a first direction along the food flow path from an upstream portion of the food flow path to a downstream portion of the food flow path. The food flow path has a freezer chamber, with the freezer chamber having an inlet and an outlet. A solution transfer line is connected to a source of pressurized solution, the solution transfer line includes an interface port translatable between a transferring position fluidly connected to the food flow path and a storage position fluidly independent of the food flow path.

23 Claims, 21 Drawing Sheets

(56)         References Cited

U.S. PATENT DOCUMENTS

| | | | |
|---|---|---|---|
| 5,410,888 | A | 5/1995 | Kaiser et al. |
| 5,419,150 | A | 5/1995 | Kaiser et al. |
| 5,799,832 | A | 9/1998 | Mayo |
| 5,888,313 | A | 3/1999 | West |
| 6,490,872 | B1 | 12/2002 | Beck et al. |
| 6,494,055 | B1 | 12/2002 | Meserole et al. |
| 6,536,224 | B2 | 3/2003 | Frank et al. |
| 6,553,779 | B1 | 4/2003 | Boyer et al. |
| 6,689,410 | B2 | 2/2004 | Gerber |
| 7,857,910 | B2 | 12/2010 | Carhuff et al. |
| 8,079,230 | B2 | 12/2011 | Frank et al. |
| 8,205,460 | B2 | 6/2012 | Russo et al. |
| 8,459,043 | B2 | 6/2013 | Bertone |
| 9,848,620 | B2 | 12/2017 | Minard et al. |
| 10,595,544 | B2 | 3/2020 | Halachmi |
| 2002/0043071 | A1 | 4/2002 | Frank et al. |
| 2002/0162577 | A1 | 11/2002 | Cocchi |
| 2003/0012864 | A1 | 1/2003 | Gerber |
| 2003/0126871 | A1 | 7/2003 | Frank et al. |
| 2005/0269362 | A1 | 12/2005 | Guerrero et al. |
| 2007/0062212 | A1 | 3/2007 | Frank et al. |
| 2008/0061081 | A1 | 3/2008 | Guerrero et al. |
| 2009/0120306 | A1 | 5/2009 | Kateman |
| 2010/0058772 | A1 | 3/2010 | Russo et al. |
| 2015/0320079 | A1 | 11/2015 | Minard et al. |
| 2016/0037963 | A1 | 2/2016 | Tuchrelo et al. |
| 2018/0141726 | A1* | 5/2018 | Holm ................... B65D 1/0207 |
| 2019/0125122 | A1* | 5/2019 | Feola ........................ A23G 9/08 |
| 2022/0104513 | A1* | 4/2022 | Tuchrelo ............... B08B 9/0325 |
| 2022/0218145 | A1* | 7/2022 | Freedman ................. F25C 1/04 |

FOREIGN PATENT DOCUMENTS

| | | |
|---|---|---|
| JP | 58-015719 A | 1/1983 |
| JP | H 02-107160 A | 4/1990 |
| JP | 08-184380 A | 7/1996 |
| JP | H01-043158 A | 2/1998 |
| JP | 2002-307032 A | 10/2002 |
| JP | 2003-519571 A | 6/2003 |
| JP | 2003-521884 A | 7/2003 |
| JP | 2012-020235 A | 2/2012 |
| JP | 2009-285566 A | 7/2013 |
| WO | 1995015090 A2 | 6/1995 |
| WO | 2000070963 A1 | 11/2000 |
| WO | 0151224 A1 | 7/2001 |
| WO | 2009059405 A1 | 5/2009 |
| WO | 2014003881 A1 | 1/2014 |
| WO | 2015022678 A1 | 2/2015 |

OTHER PUBLICATIONS

Mathworks, 4-Way Directional Valve; retrieved on Mar. 22, 2023 from https://www.mathworks.com/help/hydro/ref/4waydirectionalvalve.html (Year: 2023) .*.

* cited by examiner

165

Reservoir-1

164a

142

Air-break

172

164b

Reservoir-2     Food Flow Path

142

Cleaning Mode 164b, 170

156

Reservoir-2     Food Flow Path

Solution Inlet

External decompression

Internal decompression

AUTOMATED CLEAN-IN-PLACE APPARATUS AND METHOD

CROSS-REFERENCE TO RELATED APPLICATIONS

Field of the Invention

The present application claims the benefit of U.S. provisional patent application 63/820,864 filed Jun. 10, 2025, entitled AUTOMATED CLEAN-IN-PLACE APPARATUS AND METHOD, the entire disclosure of which is hereby incorporated by reference.

BACKGROUND OF THE INVENTION

Field of the Invention

The present disclosure relates to an apparatus and method for treating at least a portion of a food processor with a treating solution and in a further configuration to an apparatus and method for treating at least a portion of a food flow path in the food processer with the treating solution, wherein the treatment can include at least one of washing, cleaning, rinsing or sanitizing.

Description of Related Art

There is a major concern when it comes to maintaining food processors, such as but not limited to, Soft Serve Ice Cream Machines. That is, managing the growth of Colony Forming Units (CFU) has always been a challenge. Once elevated to unacceptable levels, viable bacteria can cause adverse health effects including severe diarrhea, vomiting, and dehydration. These are just a few examples of foodborne illnesses that can have a huge effect on some of the most vulnerable consumers, such as young children, and the elderly. Without constant care and due diligence for the food processor's overall health, product quality can quickly degrade and become a major health risk when consumed in any amount.

When a food processor is neglected due to poor cleaning methods, and to continue the above example, the ice cream Product Mix itself will begin to accumulate viable bacterial and/or fungal cells. When levels reach 50,000 bacteria/mL, and/or more than 10-20 coliform/mL, the product is considered unsafe for consumption (ranges can vary based on overall ingredients/composition).

Moreover, once a product mix reaches unacceptable levels of elevated contamination, the food processor's entire food path must be completely disassembled, mechanically scrubbed and chemically sanitized according to the Original Equipment Manufacturers (OEM) recommendations or by any superseding Local/State Health Code requirements. The cleaning and sanitizing process must meet the acceptable reduction of spoilage organisms of $\geq 6$ log reduction ($10^6$); only new product mix should be added back to the machine post process; and all unreclaimable product mix must be properly disposed of, hence, "breaking the chain".

Because food processors are dealing with living organisms that can harvest harmful bacteria, some soft serve ice cream machines are equipped with a technology known as Heat Treatment. This process includes pasteurizing the product mix itself. When applying Heat Treatment along an entire food path, including the Product Mix Reservoir(s)/ product mix source(s), temperatures become elevated. In return, the elevated temperatures destroy pathogenic bacteria, reducing the overall volume of spoilage organisms back to acceptable levels. For instance, the Vat method involves heating the ice cream mix to 145° F. (63° C.) and then holding the temperature for a minimum of 30 minutes; this process is implemented once every day. Per OEM recommendations, food processors will eventually be scheduled for a complete mechanical teardown for scrubbing clean and sanitizing of all internal and external components e.g., 14 days, 28 days, and so on.

Nevertheless, current technologies do fall short. For instance, although the pasteurization process cleans the product mix, it does not address the physical cleaning of the equipment itself. Thus, a CIP system, such as that described herein, may be separate from or be integrated with and complement an existing Heat Treatment system. Mechanical neglect becomes a direct result from the lack of frequent interaction with the machine. Long periods of time between full machine teardowns exacerbate the possibilities that can lead to cross-contamination of the product mix. By way of example the outer machine surface (food contact surfaces outside the scope of the Heat Treatment process) is not necessarily being cleaned and sanitized on a regular basis. This lack of cleaning can lead to compromised surfaces which may act as touch points that open the possibility of Operators inadvertently transferring contaminants into the fresh product mix despite the wearing of protective gloves.

Furthermore, the entire Heat Treatment process, which includes both heating up and cooling down the product mix can take several hours to complete. The entirety of the cycle can wind up taking hours, which leads to disappointed customers, especially those who want to place an order for ice cream while the machine is in the middle of its heat treatment process. Machine cleaning may also leave the consumer unaware thinking the machine is broken, or frequently down for service. Any type of cleaning and sanitizing protocol that takes several hours to complete is simply unacceptable for any Quick Serve Restaurant (QSR) that operates 24/7.

Therefore, a need exists for a Clean-In-Place (CIP) System for selectively washing, rinsing, cleaning and/or sanitizing a food flow path in a food processor with reduced operator input and time, while providing enhanced efficacy of the treatment.

BRIEF SUMMARY OF THE INVENTION

As automation continues to make headway into the QSR arena, there is a push to have equipment that can, if possible, maintain itself as far as it relates to keeping itself clean, sanitized and mechanically sound, all while doing so in an acceptable amount of downtime without any compromise to product quality and safety.

There is a lot of benefit associated with a machine that can keep itself and associated parts isolated from other food equipment during a cleaning and sanitizing process. For instance, when combining parts from one food processor with parts from another in a 3-bay sink, cross contamination can occur. Also, soaking ice cream machine parts with dirty kitchen utensils can lead to the transfer of bacteria like Salmonella; the possibilities of transferring bacteria become endless. A self-cleaning ice cream machine, encompassed with as many of its own cleaning tools, i.e., Handheld Spray Wand, Spray booth, etc., is a very effective way to increase efficacious results, while mitigating risk. As such, the potential for cross-contamination is greatly reduced if not completely eliminated.

In one configuration, the present disclosure provides a food processor comprising a food flow path extending from a food flow path input to a food flow path output. Food product passes in a first direction along the food flow path from an upstream portion of the food flow path to a downstream portion of the food flow path. The food flow path has a freezer chamber, with the freezer chamber having an inlet and an outlet. A solution transfer line is connected to a source of pressurized solution; the solution transfer line includes an interface port translatable between a transferring position fluidly connected to the food flow path and a storage position fluidly independent of the food flow path.

In a further configuration, the food processor may further include a valve fluidly intermediate the source of pressurized solution and the interface port. The valve is moveable between a closed position inhibiting flow through the valve and an open position permitting the passage of solution through the valve to the interface port. A first controller may be operably connected to at least one of the interface port and the valve. The first controller may be configured to dispose the valve in the open position and the interface port in the storage position. Still further, the first controller may be operably connected to both the interface port and the valve. The valve may be located in the solution transfer line and the controller may include a driver connected to the interface port to selectively translate the interface port to one of the transferring position and the storage position.

It is contemplated the first controller may also be operably connected the interface port to dispose the interface port in at least one of the transferring position and the storage position. A second controller may be operably connected to the valve. The second controller may be configured to selectively dispose the valve in at least one of the open position and the closed position. The food processor may further include a dispensing valve in the food flow path. The dispensing valve may be configured to selectively permit food product to pass from the food flow path. In certain embodiments the dispensing valve may be a draw valve, ball valve, or other suitable device. The food processor may also define a food product dispensing area beneath the dispensing valve and may further include a shroud movable between a dispensing position wherein dispensing valve is accessible to dispense food product and a cleaning position wherein the shroud encompasses the dispensing valve and a portion of pressurized solution is configured to wash the dispensing valve. The food processor may further include a drip tray located below the dispensing valve and the shroud. The drip tray may be configured to receive waste food product from the dispensing valve when the shroud is in the dispensing position and the portion of pressurized solution when the shroud is in the cleaning position. A drip tray drain line may be configured to be flushed by the portion of pressurized solution.

In a further configuration, the food processor may also include a pressure sensor in the food flow path. The pressure sensor may be a pressure switch. The food processor may further include a prime plug that is moveable to a first position exposing a portion of the food flow path to an atmospheric pressure, a second position isolating the food flow path from the atmospheric pressure, and a third position locating a portion of the prime plug external to the food flow path. In an alternative configuration, the dispensing valve may include a priming orifice so as to selectively operate as a dispensing valve or prime plug depending upon the orientation of the dispensing valve. A driver may connect to the prime plug to move the prime plug between the first position, the second position, and the third position. The driver may be a longitudinal gear rack.

In still another configuration, the food processor may include an active drain line selectively connectable to the food flow path and a passive drain line selectively connectable to the food flow path. The active drain line is connected to a pressure source. The active drain line and the passive drain line are configured for simultaneous and independent flow through the respective drain line. It should also be noted that the two separate drain lines can be combined to have one outlet and may be further separated by a valve to preclude backflow from the active drain line into the passive drain line. The pressure source is at higher pressure than an ambient/atmospheric pressure source. A temperature sensor may also be configured to monitor a temperature in at least one of the active drain line and/or the passive drain line and a controller may be operably connected to the solution transfer line and configured (i) to impart flow in the solution transfer line with the interface port in the transferring position and (ii) to impart fluid pressure within the solution transfer line with the interface port in the storage position.

The present disclosure also includes a food processor having a food flow path extending from a food flow path input to a food flow path output. Food product passes in a first direction along the food flow path from an upstream portion of the food flow path to a downstream portion of the food flow path. The food flow path has a freezer chamber having an inlet and an outlet. A dispensing valve is movable between an operating position and a cleaning position. The dispensing valve has a sealing surface configured to contact a surface of the food flow path in a compressed state when the dispensing valve is in the operating position. The dispensing valve is movable from the operating position to the cleaning position to dispose the sealing surface in an uncompressed state. The cleaning position of the dispensing valve may locate the sealing surface either internal or external to the food flow path. Additionally, the dispensing valve may be a draw valve, ball valve or other suitable device.

The food processor may further include an actuator configured to move the dispensing valve from the operating position to the cleaning position. A solution dispensing port may also be configured to dispense solution onto the sealing surface in the cleaning position of the dispensing valve. The solution dispensing port may be a sprayer. A controller may be connected to the actuator to initiate movement of the dispensing valve from the operating position to the cleaning position. The dispensing valve may include a solution passage fluidly connected to the food flow path in the cleaning position of the dispensing valve and the solution passage fluidly disconnected from the food flow path in the operating position of the dispensing valve.

The present disclosure further includes a food processor having a food flow path extending from a food flow path input to a food flow path output. Food product passes in a first direction along the food flow path from an upstream portion of the food flow path to a downstream portion of the food flow path. The food flow path has a freezer chamber having an inlet and an outlet. A solution transfer line may be connected to a source of pressurized solution. The solution transfer line may include an interface port moveable between a transferring position wherein the solution transfer line is fluidly connected to the food flow path and a storage position wherein the solution transfer line is fluidly independent of the food flow path. A valve may be coupled to the solution transfer line intermediate the source of pressurized solution and the interface port. The valve may be moveable between a closed position inhibiting flow of the pressurized solution through the valve and an open position permitting the flow of pressurized solution through the valve. A driver may be connected to the interface port to selectively translate/move the interface port to the transferring position wherein the solution transfer line is fluidly connected to the food flow path. A controller may be connected to i) the valve, and ii) at least one of the driver and the interface port. The controller may be configured to position the valve in the open position and the interface port in each of the transferring position and the storage position. The driver may also be connected to the solution transfer line.

The present disclosure may also include a food processor having a food flow path extending from a food flow path input to a food flow path output. Food product passes in a first direction along the food flow path from an upstream portion of the food flow path to a downstream portion of the food flow path. The food flow path has a freezer chamber having an inlet and an outlet. A solution transfer line connected to a source of pressurized solution. The solution transfer line includes an interface port translatable between a coupled position fluidly connected to the food flow path and a decoupled position fluidly separate/independent of the food flow path. A valve is coupled to the solution transfer line intermediate the source of pressurized solution and the interface port. The valve is moveable between a closed position blocking flow through the valve to the interface port and an open position permitting the passage of solution through the valve to the interface port. An actuator is connected to the solution transfer line and configured to translate the interface port from one of the coupled position in fluid communication with the food flow path and the decoupled position separating the interface port from the food flow path to a remaining one of the coupled position in fluid communication with the food flow path and the decoupled position separating the interface port from the food flow path. In one aspect, the actuator is configured to translate the interface port between the coupled position in fluid communication with the food flow path and the decoupled position separating the interface port from the food flow path. A controller may be connected to the actuator to automatically translate the interface port to the coupled position in fluid communication with the food flow path in response to a predetermined criteria.

The present disclosure may still further include a food processor having a food flow path extending from a food flow path input to a food flow path output. Food product passes in a first direction along the food flow path from an upstream portion of the food flow path to a downstream portion of the food flow path. The food flow path has a freezer chamber having an inlet and an outlet. A dispensing valve may have an operational range within the food flow path. The dispensing valve includes a sealing surface selectively permitting or precluding passage of the food product in the food flow path within the operational range. The dispensing valve is also moveable to a cleaning position wherein the sealing surface is decompressed relative to the food flow path and outside the operational range. An actuator or switcher may be configured to move the dispensing valve from the operational range to the cleaning position.

In a further configuration, the food processor may further include a solution dispensing port configured to dispense solution onto the sealing surface external to the food flow path. The solution dispensing port may be a sprayer. A controller may also be connected to the actuator to initiate the movement of the dispensing valve from the operational range to the cleaning position. The dispensing valve may further include a solution passage fluidly connected to the food flow path in the cleaning position of the dispensing valve. The solution passage may be fluidly disconnected from the food flow path in the operational range of the dispensing valve. A transfer arm has a first end coupled to the actuator and a second end coupled to the dispensing valve wherein the transfer arm is a platform connected to the dispensing valve.

In another configuration, the present disclosure provides a food processor includes a food flow path extending from a food flow path input to a food flow path output. Food product passes in a first direction along the food flow path from an upstream portion of the food flow path to a downstream portion of the food flow path. The food flow path has a freezer chamber having an inlet and an outlet. A prime plug is moveable to a first position exposing a portion of the food flow path to an atmospheric pressure, a second position isolating the food flow path from the atmospheric pressure, and a third position locating a portion of the prime plug external to the food flow path. The prime plug includes a plurality of longitudinally spaced grooves configured to allow ratcheting movement of the prime plug between the first position, the second position, and the third position. A driver may be connected to the prime plug to move the prime plug between the first position, the second position, and the third position. The driver may be a longitudinal gear rack.

A method is provided for priming a food processor. The food processor has a food flow path extending from a food flow path input to a food flow path output. A food product passes in a first direction along the food flow path from an upstream portion of the food flow path to a downstream portion of the food flow path. The food flow path has a freezer chamber having an inlet and an outlet. A prime plug is moveable to a first position exposing a portion of the food flow path to an atmospheric pressure, a second position isolating the food flow path from the atmospheric pressure, and a third position locating a portion of the prime plug external to the food flow path. The method includes: a) moving the prime plug to the first position to open the freezer chamber to atmosphere; b) evacuating all sanitizer residual from the food flow path by displacement with new product mix flowing through the food flow path, c) filling the freezer chamber with new product mix to the proper level; d) moving the prime plug to the second position to isolate the freezing chamber from atmosphere; and e) placing the food processor into a "Standby Mode" wherein the freezer chamber is maintained between about 35-38° F. (1-3.33° C.), to keep the new product mix refrigerated to preserve freshness, prevent spoilage, and slow bacterial growth. In a further embodiment, the residual sanitizer may be evacuated out the downstream food flow path by placing the dispensing valve in an open position. After a predetermined period of time, the dispensing valve will be returned to its closed position for filling of the freezer chamber with new product mix.

A further method is provided for cleaning a food processor. The food processor has a food flow path for processing a food product. The food flow path includes a product mix source, a downstream freezer chamber, and a dispensing valve for dispensing the food product from the food flow path. The method includes (a) removing food product from at least a first portion of the food flow path; (b) passing the removed portion of the food product to a thermal treatment receptacle; (c) establishing a predetermined time/temperature profile in the food product in the thermal treatment receptacle to provide a heat treated food product; (d) at least one of cleaning or sanitizing a second portion of the food flow path; and (c) introducing the heat treated food product into the food flow path.

In a further aspect of the method, the first portion of the food flow path and the second portion of the food flow path are the same. The thermal treatment receptacle may also be independent of the food flow path and may be releasably fluidly connected to the food flow path. The thermal treatment receptacle may include a container for retaining the food product in the thermal treatment receptacle and may be external to the food flow path. The step of establishing a predetermined time/temperature profile in the food product in the thermal treatment receptacle may be concurrent with a portion of at least one of cleaning and sanitizing the second portion of the food flow path. Removing food product from at least a portion of the food flow path may include removing food product from at least one of the reservoir/product mix source and the freezer chamber and/or from upstream of the dispensing valve. Introducing the heat-treated food product into the food flow path may occur subsequent to at least one of cleaning and sanitizing the second portion of the food flow path.

In another configuration, the present disclosure provides a food processor including a reservoir/product mix source for retaining a volume of food product and a food flow path extending from the reservoir/product mix source to a dispensing valve for dispensing the food product. A freezer chamber is located in the food flow path intermediate the reservoir/product mix source and the dispensing valve. A thermal treatment receptacle may be located external to the food flow path with the thermal treatment receptacle being configured to impart a predetermined time/temperature profile to a food product in the thermal treatment receptacle. A cleaning solution source is selectively connected to the food flow path and a controller is configured to control the thermal treatment receptacle to impart (i) the predetermined time/temperature profile to a food product in the thermal treatment receptacle and (ii) a flow of the cleaning solution into a portion of the food flow path.

BRIEF DESCRIPTION OF THE SEVERAL VIEWS OF THE DRAWING(S)

DETAILED DESCRIPTION OF THE INVENTION

Figure 1:
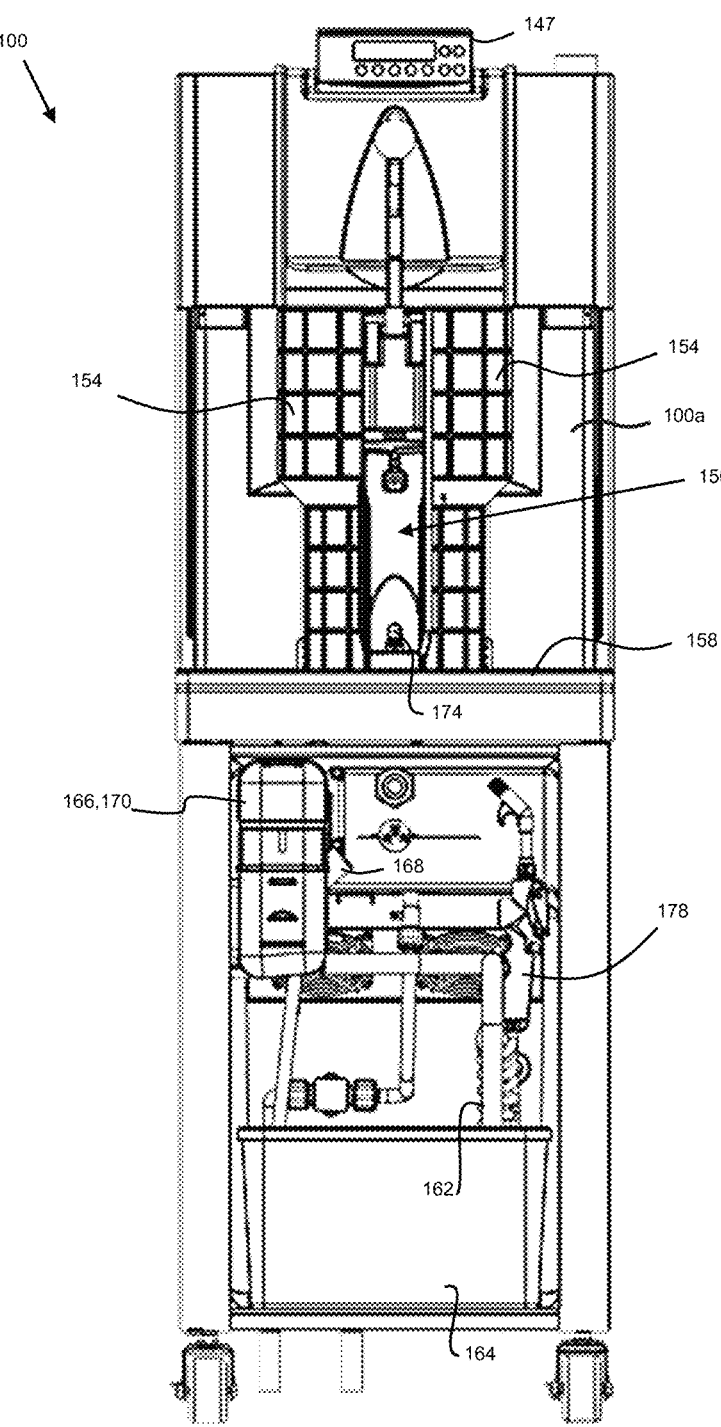
FIG. 1 is a front plan view of an exemplary embodiment of a representative food processor in accordance with the present invention.
Figure 2:
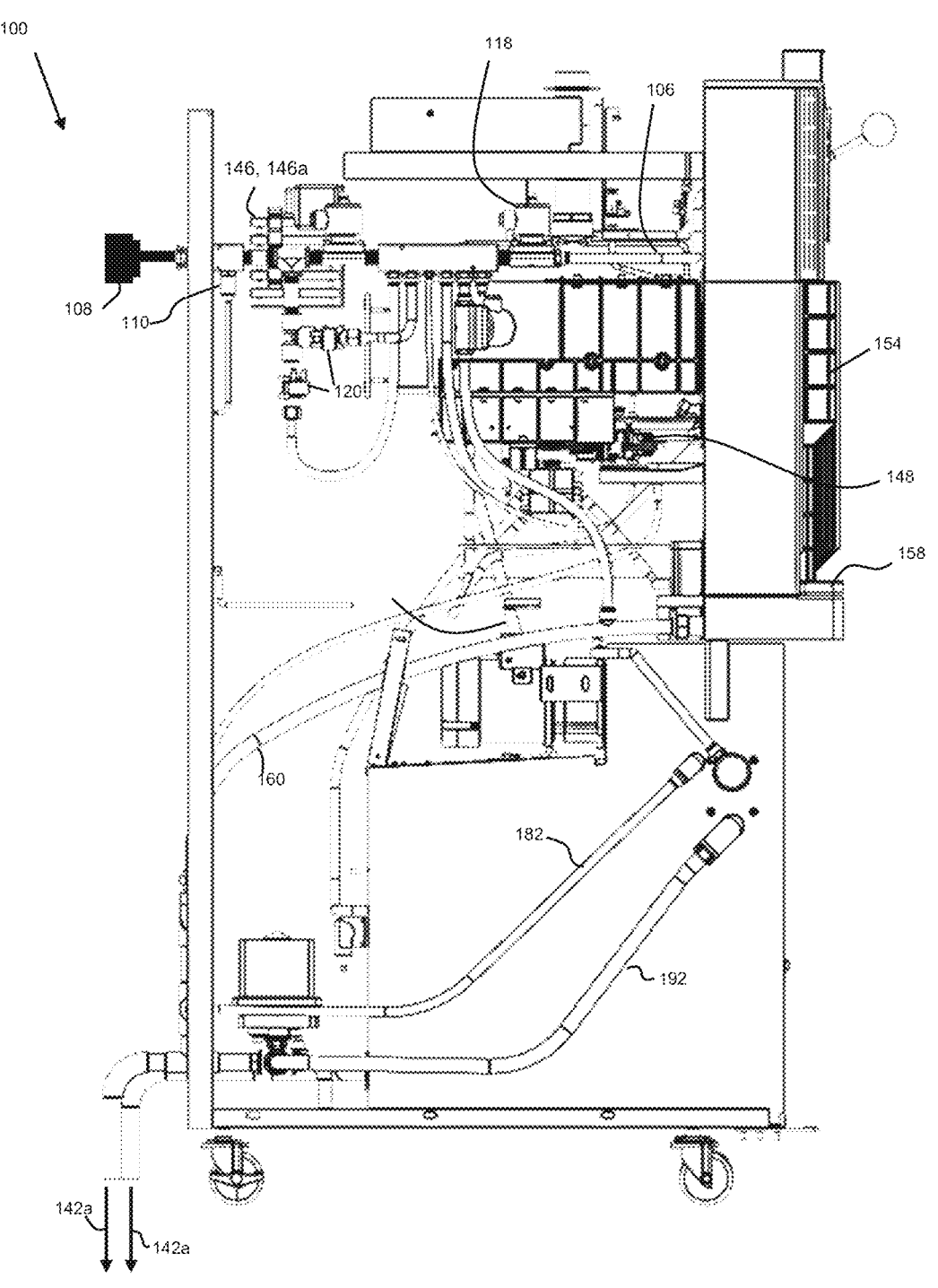
FIG. 2 is a left plan view of the exemplary embodiment of a representative food processor shown in FIG. 1 with the side panel removed.

The various figures illustrate representative embodiments of a food processor in accordance with the present invention. The food processor can be any of a variety of configurations for processing any of a variety of food products including, but not limited to, frozen or chilled food product including but not limited to, beverages such as sodas, beer or wine, ice or iced food products, desserts, diary-based products as well as cooked and/or extruded food product. The food processor can include any variety of devices, including but not limited to soft serve machines, batch freezers, slush freezers, shake freezers, blended ice machines or food processors for extruding food products which include flows, grains or meats as well as liquid dispensers for beverages including soft drinks, diary drinks or alcoholic beverages such as fermented or distilled spirits. Thus, the food product can be any corresponding product for consumption, wherein the food product may be subjected to processing that includes temperature control including but not limited to raising or lower a temperature, food product mixing, blending, altering, processing or extruding by the food processor. The food product can include precursor food products that change composition or consistency by virtue of being processed along the food flow path, wherein they can be converted to a processed food product.

With reference to the drawings and FIGS. 1-4 in particular, describe herein is an exemplary food processor 100, such as dispensing freezer, having a food flow path 102 extending from an upstream portion 102b to a downward portion 102c and containing at least one freezing barrel 104 in the food flow path 102, and at least releasable sanitization line 106 (also called a solution transfer line) to enable an integrated clean-in-place (CIP) system. The releasable sanitization line may be connected to a pressurized freshwater supply system (municipal) or other source 108 of pressurized freshwater. The water supply pressure (35-65 PSI) is regulated by a water regulating unit 110 between a 28-32 PSI range and the input water temperature is controlled by a hot water mixing valve within water regulating unit 110 that is set to about 112° F. (44.4° C.)+/−5° F. (−15° C.). The solution transfer line 106 also includes an interface port 112 translatable between a transferring position fluidly connected to the food flow path 102 and a storage position fluidly independent of the food flow path 102. A driver 114 may be connected to the interface port 112 to selectively translate the interface port 112 to one of the transferring position and the storage position.

In certain embodiments, one or more multiport valves 116 may be added to the food flow path and/or the solution transfer line to enable the automation of re-directing product mix, and/or cleaning/sanitizing solutions throughout the entire food flow path, including all fluid flow lines required to construct an integrated CIP System, including flow control valve 118. Excluded from the food flow path are all valves and sanitary solution lines 120 necessary to safely deliver freshwater, cleaner, and sanitizer into the food flow path 102, which for this present disclosure is made possible through interface port 112.

In exemplary embodiments, interface port 112 may comprise a dispensing valve 122 slidably received within a freezer door 124 of food processor 100. Dispensing valve 122 includes a terminal portion 106a of sanitation line 106 that is translocatable relative to food flow path 102 as will be described in greater detail below. With reference to FIGS. 5-8, dispensing valve 122 may generally be in the shape of an elongated member, such as a cylinder, having a valve body 123 having a first end 126 and an opposing second end 128 along a longitudinal axis A. Valve body 123 may further define a partial internal bore 130 extending along longitudinal axis A between first end 126 and a valve bore bottom wall 132 located a spaced distance from second end 128, with internal bore 130 comprising the terminal portion 106a. The portion of the valve body between the valve bore bottom wall 132 and the second end 128 defines a flow plug 134. An inlet orifice 136 is defined within valve body 123 proximate first end 126 and extends from the outer surface of the valve body to the internal bore 130. An outlet orifice 138 is defined within valve body 123 proximate valve bore bottom wall and constitutes the terminal end 106b of sanitation line 106. In select embodiments, dispensing valve 122 may be a draw valve, a ball valve or any other suitable device.

Figure 7:
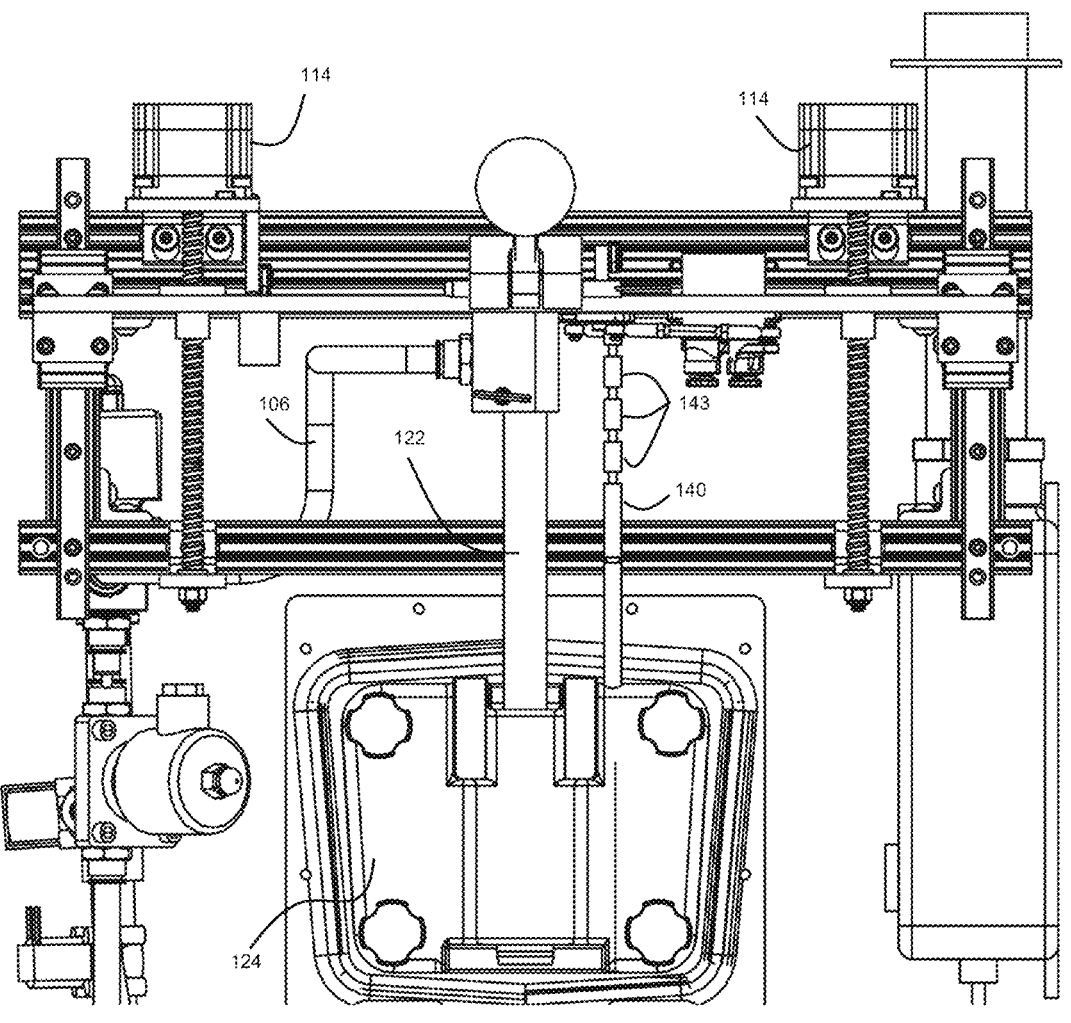
FIG. 7 is a partial front plan view of the exemplary embodiment of a dispensing valve shown in FIG. 5 and an exemplary drive system configured to translocated the dispensing valve.
Figure 8:
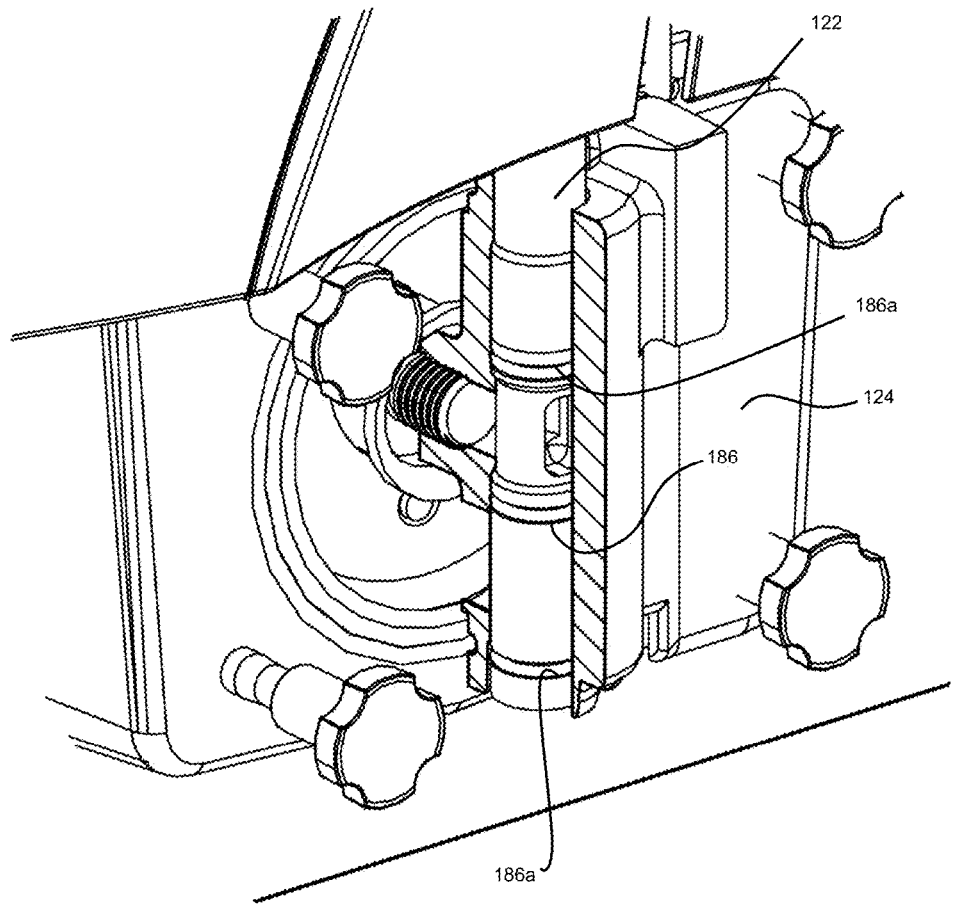
FIG. 8 is an expanded perspective view of the exemplary dispensing valve mounted with a freezer door, with the freezer door being shown in cross section.

As best shown in FIG. 7, food processor 100 may also include an air bleed port, or more preferably a prime plug 140. Prime plug 140 may be moveable to a first position exposing a portion of the food flow path 102 to atmospheric pressure and thereby allowing all or a large portion of air trapped within food flow path 102 to be expelled. A second position of prime plug 140 isolates food flow path 102 from the atmospheric pressure and enables pressurization of food flow path 102 and dispensing of food product 142 under normal operating conditions. When prime plug 140 is in a third position, a portion 140a of prime plug 140 is located external to the food flow path 102 whereby portion 140a is locatable for rinsing, cleaning, and sanitizing as will described below. In certain embodiment, prime plug 140 may include a plurality of longitudinally spaced grooves 143 which are configured to allow ratcheting movement of prime plug 140 between the first position, the second position, and the third position. Driver 114 may be coupled to prime plug 140 to operably move prime plug 140 between the first position, the second position, and the third position.

In an exemplary embodiment, a controller 146 may be operably connected to driver 114 and interface port 112 and/or dispensing valve 122, and prime plug 140 and input controlled via a user interface 147. Controller 146 may include a memory and a processor programmed to store and execute an Automated Cleaning and Sanitizing Process (ACSP) algorithm which will be described in greater detail below with reference to FIGS. 12A-12C. Cleaner/sanitizer may be introduced into the CIP system via a mechanical pump 148 which may be controlled to dispense a volume of liquid concentrate based on a frequency of pulses. By way of example, for every pulse there is an associated pump stroke that discharges a predetermined amount of concentrate. For a given freshwater flow rate, such as and without limitation between about 0.1 and about 5.0 gallons per minute (GPM), the liquid concentrate is metered into the freshwater's flow path, such as via a distribution manifold (chamber with multiple ports) to allow mixing and forming a solution having the correct solution ratio. It should be noted that a second controller 146a (see FIGS. 2-4) may be configured to selectively dispose the valve in at least one of the open position and the closed position.

It should be noted that ready-to-use cleaners and sanitizers may also be used, however, these may be impractical for many reasons such as but not limited to, cost, storage limitations, and difficulty in implementation. For instance, ready-to-use solutions may require that the entire food flow path and all applicable solution lines be completely vacated of any liquids prior to introducing the ready-to-use solution so as to ensure no further dilution could take place which would weaken the product's efficacy. It should also be further noted that other forms of cleaning/sanitation solvents may include solids and gases. Each form requires its own unique mechanical means of dispensing for readiness to be properly conditioned and then exposed to the food flow path.

It is further contemplated that hot water may also be a viable cleaning/sanitizing option that offers a safe, natural alternative. However, when implementing elevated water temperatures that can reach 160° F. (71° C.) which are effective at killing most pathogens, such extremely hot water can inadvertently pose a potential threat to the operator. By way of example, exposure to these elevated temperatures, such as through hardware failures and/or machine malfunction, can cause severe burns. For instance, 140° F. (60° C.) can inflict a third-degree burn in roughly 3 seconds. Moreover, the hot water may be generated using a heating element that will consume additional electricity and may also increase cleaning time. That is, as the heated water flows through the machine, it will ultimately cool while flowing. Thus, to ensure that all surfaces have been heated properly additional flow time of the hot water is needed to ensure that all portions of the food path have reached temperature. This additional time is on top of the specified duration of treatment/exposure required to achieve proper efficacy.

Food processor 100 may also define a food product dispensing area 150 located beneath the dispensing valve 122 wherein dispensing valve 122 is configured to selectively permit food product 142 to pass from the food flow path 102 into a dish or cone 152 for serving to a consumer. In certain embodiments, flow plug 134 may be dimensioned such that during normal operation of food processor 100 flow plug 134 occludes flow path 102 and prevents dispensing food product 142 until an Operator translocates dispensing valve 122 such that flow plug 134 is removed from the food flow path and food product 142 is dispensed, such as into a dish or cone 152.

Figure 9:
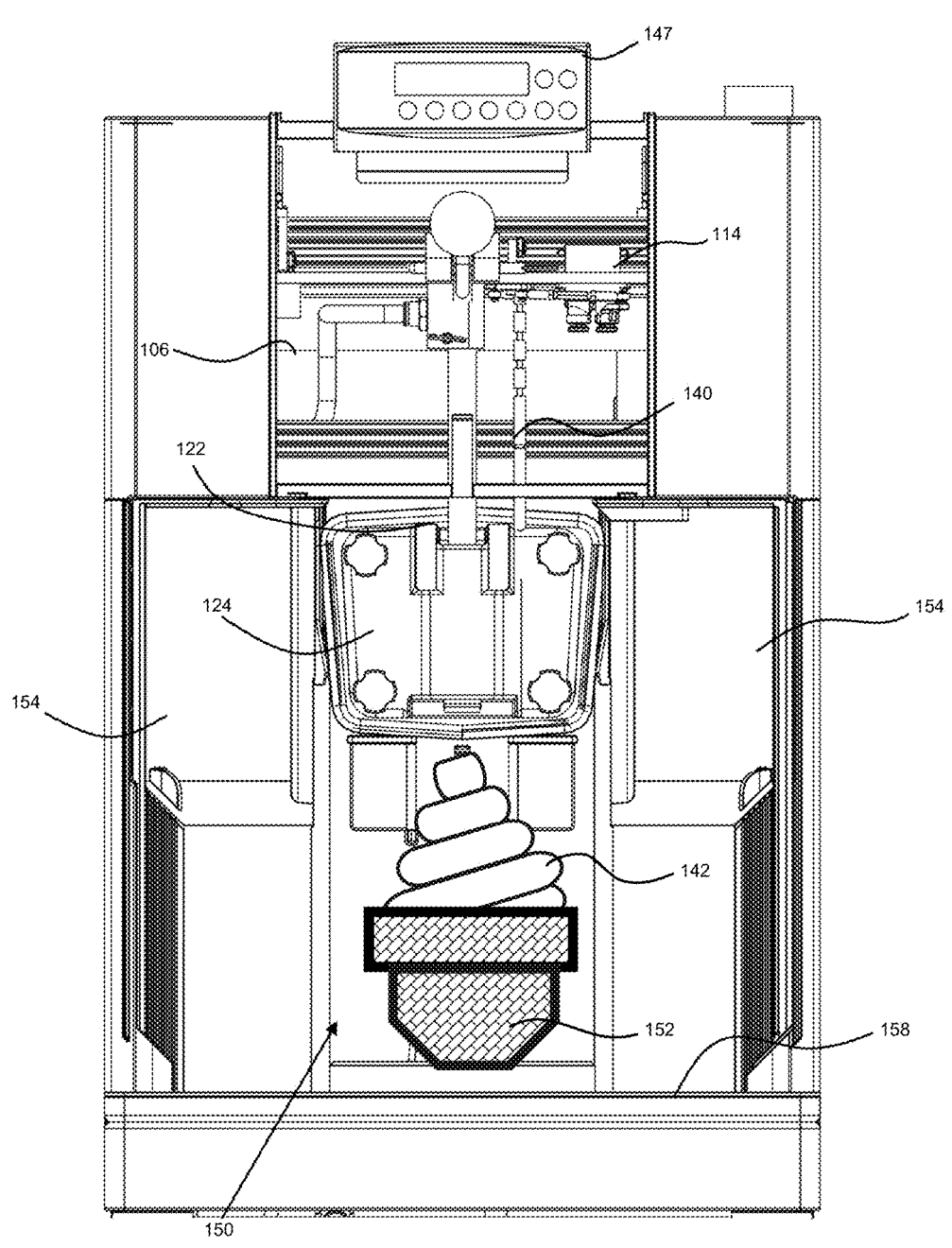
FIG. 9 is a partial front view of the exemplary food processor showing dispensing of a food product.
Figure 10:
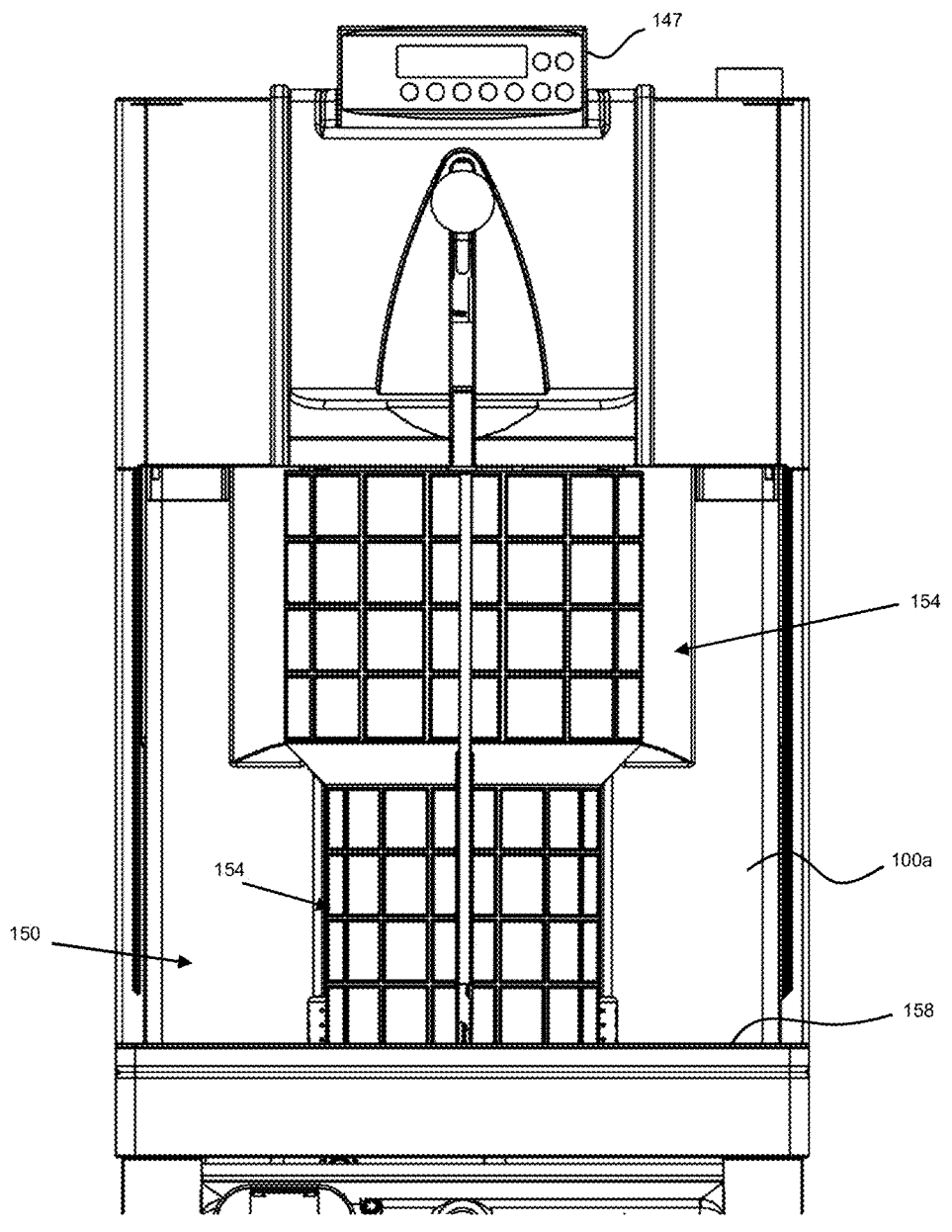
FIG. 10 is a partial front view of the exemplary food processor showing an exemplary embodiment of a cleaning shroud in the closed position.
Figure 11:
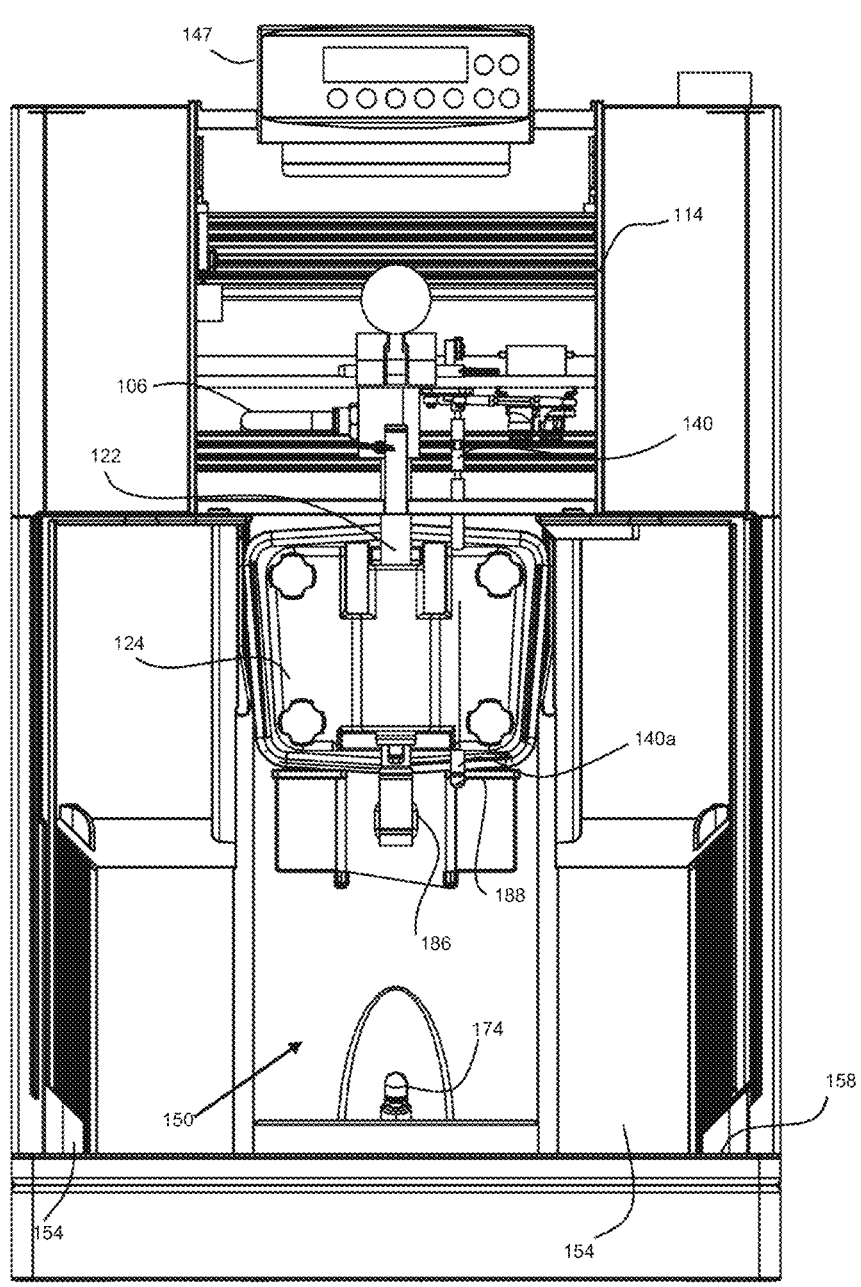
FIG. 11 is a partial front view of the exemplary food processor showing the shroud in an open position and the dispensing valve in a cleaning position.

Food processor 100 may further include a shroud 154 movable between a dispensing position wherein dispensing valve 122 is accessible to dispense food product 142 (see FIG. 9) and a cleaning position wherein shroud 154 encloses dispensing valve 122 such that a portion of pressurized solution 156 is configured to wash the dispensing valve 122 (see FIG. 10). Food processor 100 may further include a drip tray 158 located below the dispensing valve 122 and shroud 154 and forming the bottom surface of food product dispensing area 150. The drip tray 158 may be configured to receive waste food product 142a from the dispensing valve 122 when the shroud 154 is in the dispensing position and the portion 156 of pressurized solution when the shroud 154 is in the cleaning position. A drip tray drain line 160 may be configured to redirect waste food product 142a to waste and be flushed by the portion of pressurized solution 156.

Figure 12A:
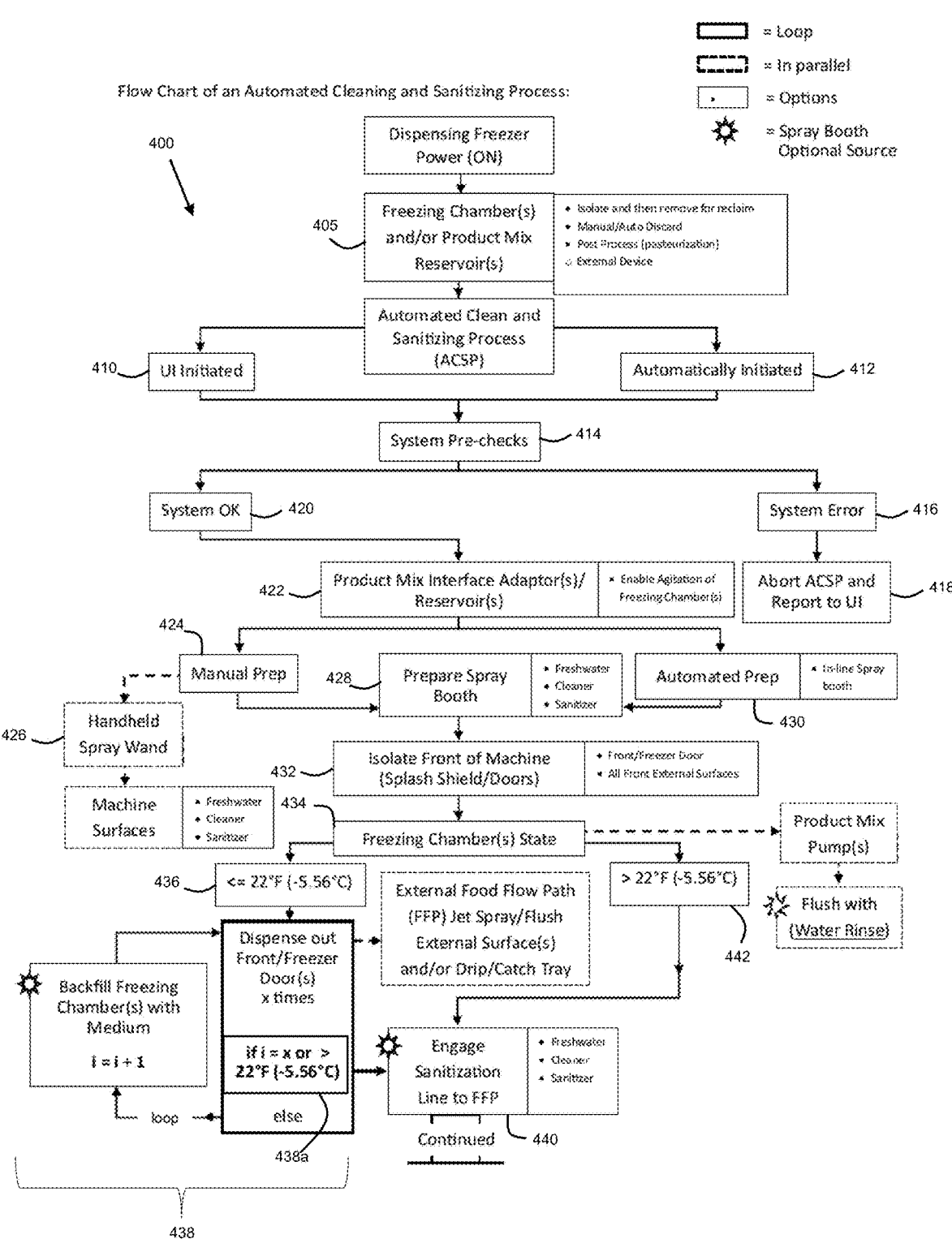
FIG. 12A is a algorithmic representation of an exemplary Automated Cleaning and Sanitizing Process (ACSP) in accordance with an embodiment of the present invention.
Figure 12B:
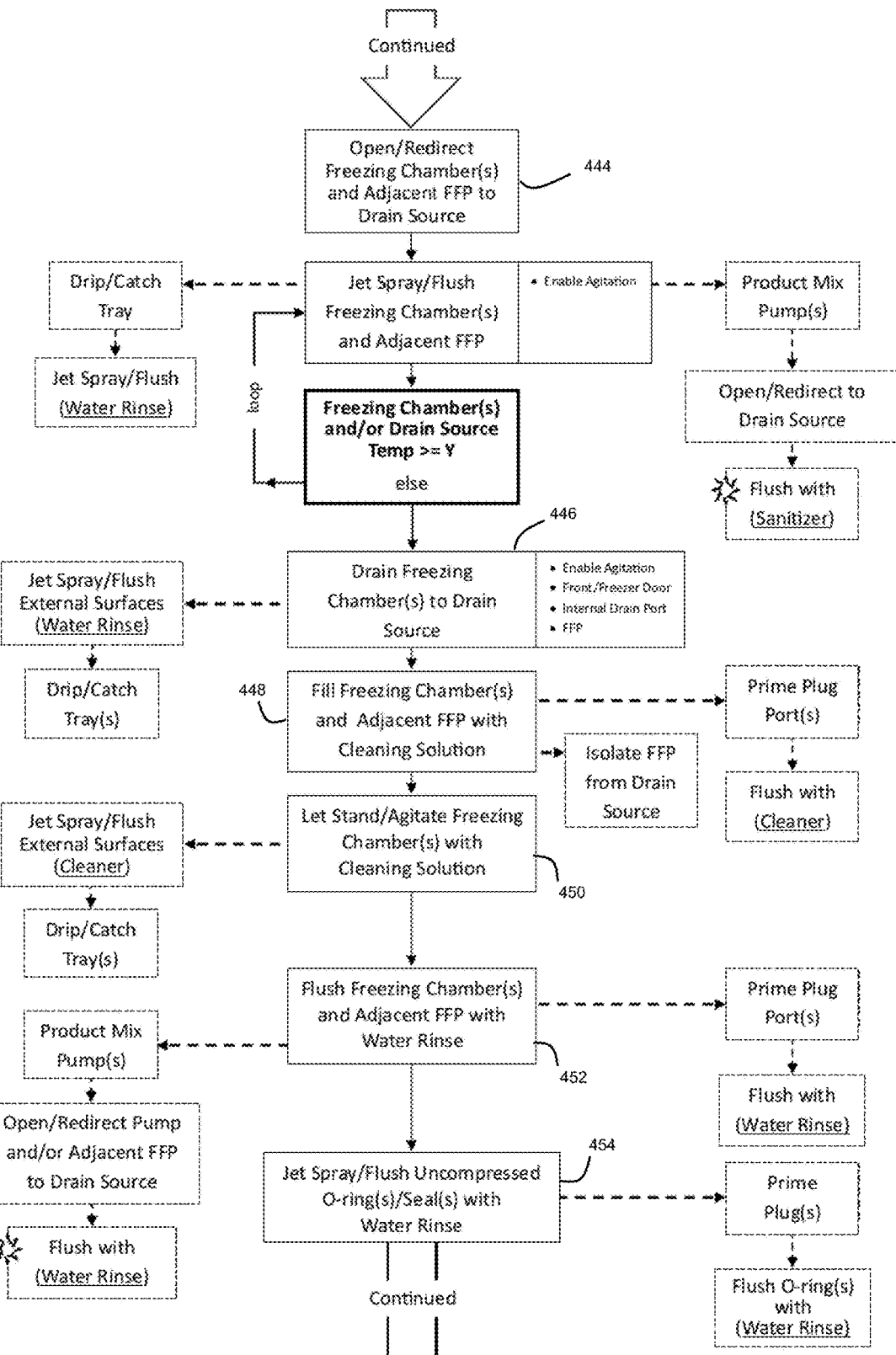
FIG. 12B is a continued algorithmic representation of the exemplary ACSP.
Figure 12C:
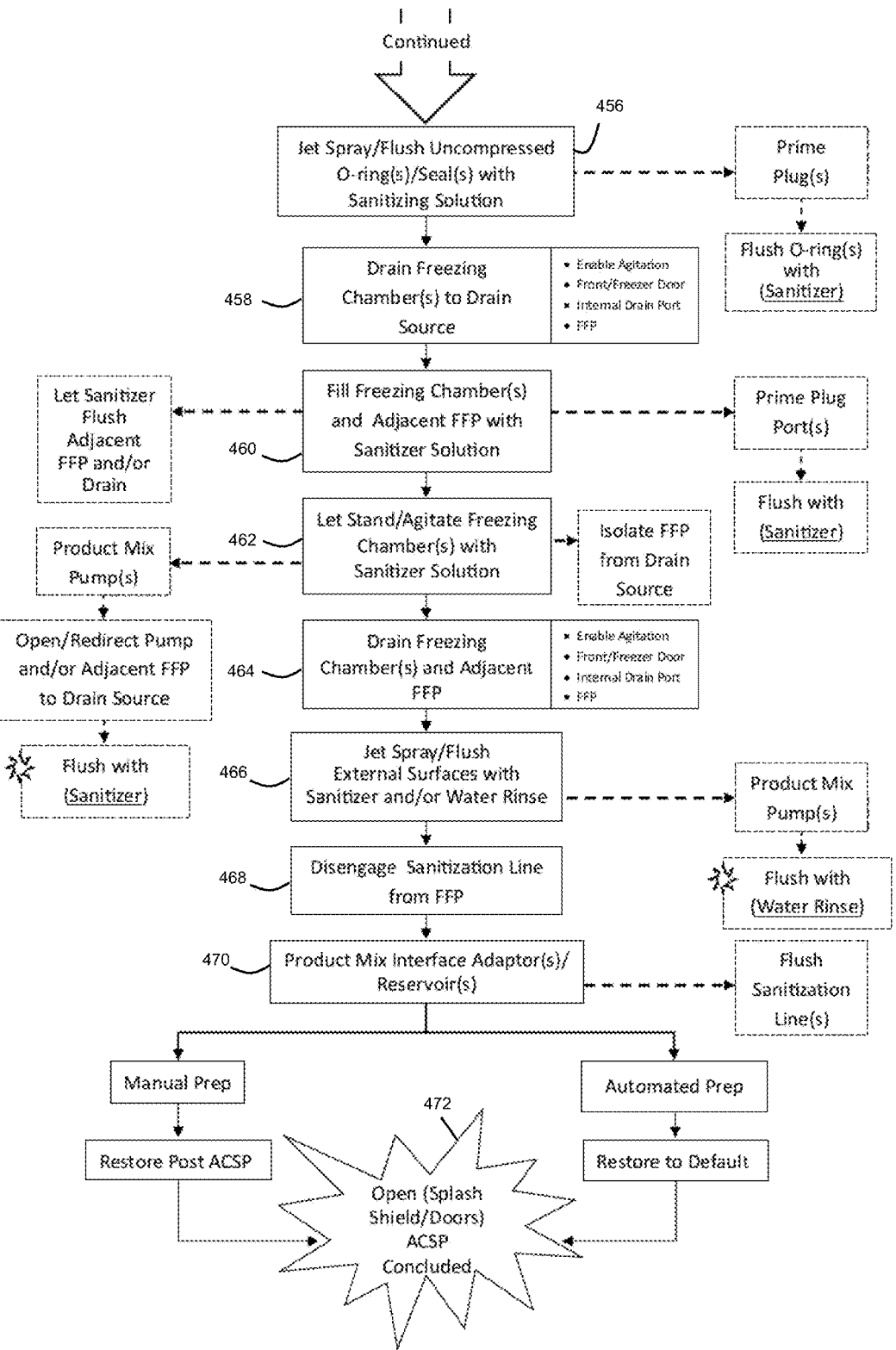
FIG. 12C is a continued algorithmic representation of the exemplary ACSP.

With reference to FIGS. 12A-12C, an exemplary embodiment of a method 400 for the Automated Cleaning and Sanitizing Process (ACSP) in accordance with the present invention may start in one of two ways: first 410, an Operator can manually invoke a cycle through a User Interface (UI) 147, or second 412, the food processor may initiate the ACSP itself based on automated scheduling, which could include user predefined inputs and/or artificial intelligence (AI), or following sensor feedback regarding food safety compromise. With either initiation, a first step 405 manages the frozen product mix remaining in the food flow path. By way of example, the frozen product mix can be manually removed from the food flow path of the machine prior to the ACSP according to acceptable Local and State Health Code practices. Alternatively, the frozen product mix can be automatically managed by the food processor for the purpose of reuse (reclaimed product mix) or disposal. If the ice cream machine is equipped with a refrigeration cabinet, both the reclaimed and fresh product mix can reside within their own isolated reservoirs during and after the ACSP has concluded. Any saved/reclaimed product mix would later be removed for post processing accordingly. It should be noted that in certain embodiments the reclaimed product mix may reside in an external containment vessel or center that is capable of preserving the product mix, including preservation for eventual post-processing.

Figure 4:
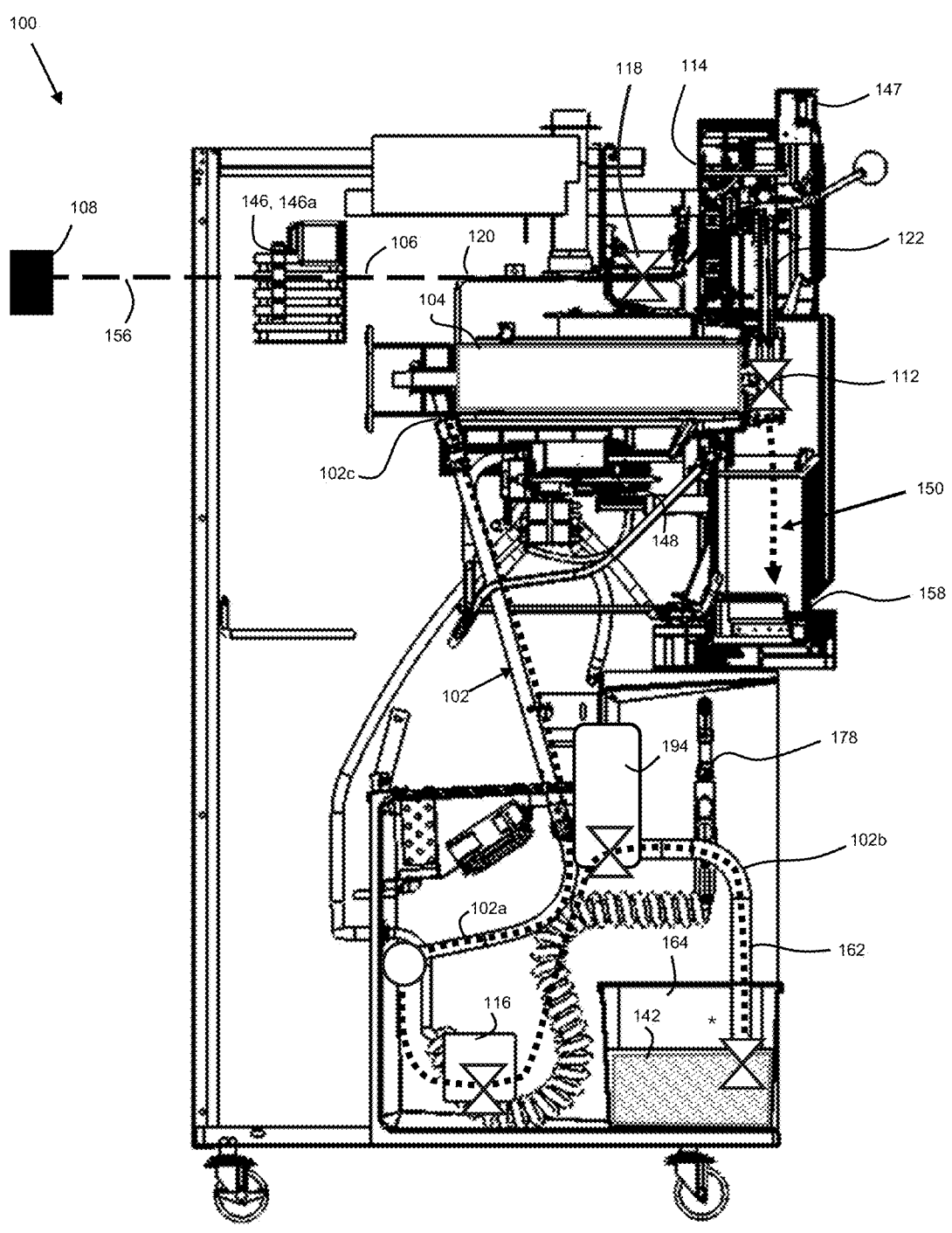
FIG. 4 is a left plan view of the exemplary embodiment of a representative food processor shown in FIG. 1 showing generalized flow paths for each of the food product and pressurized water.
Figures 5, 6:
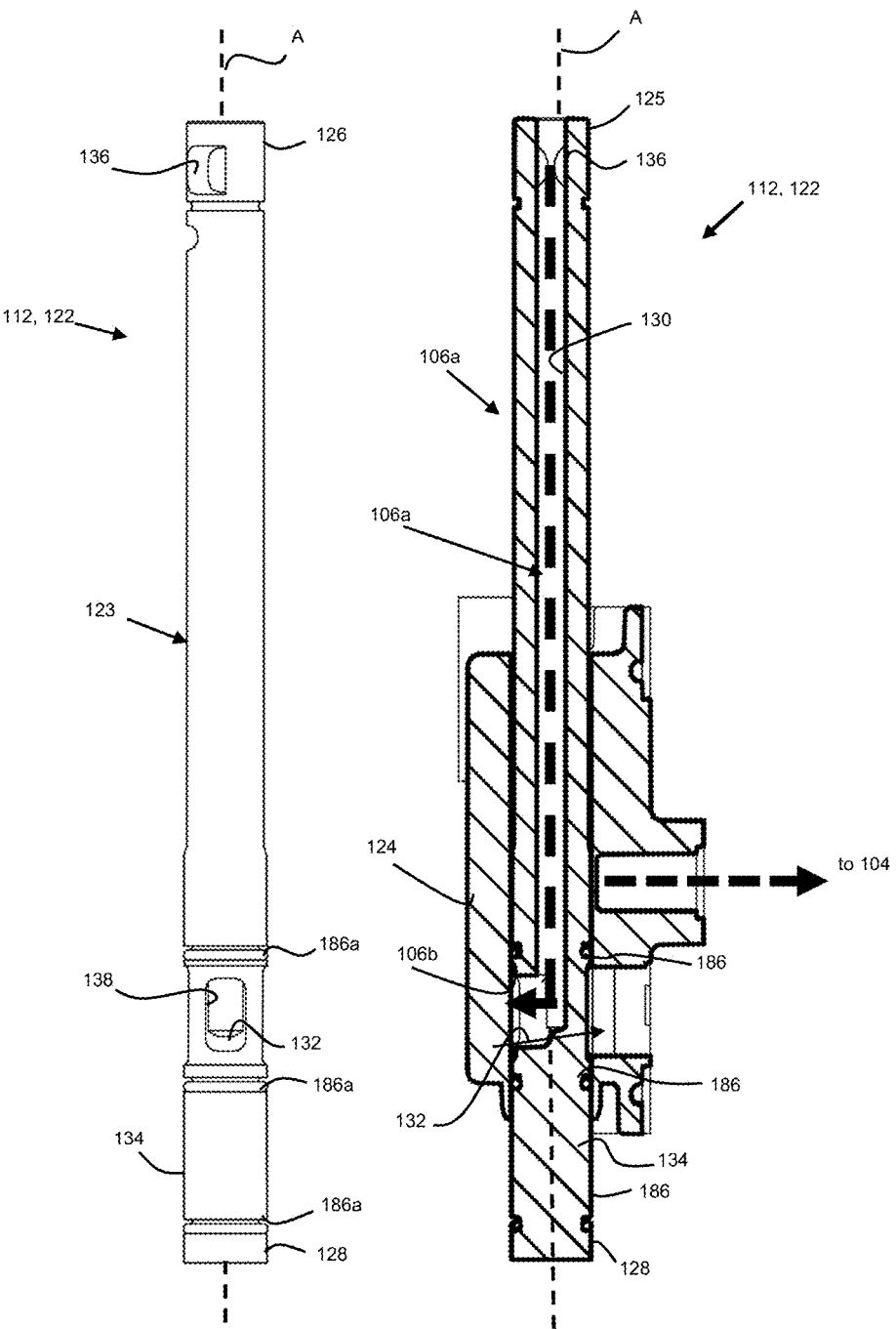
FIG. 5 is a front plan view of an exemplary embodiment of a dispensing valve configured for use within the representative food processor shown in FIG. 1.
FIG. 6 is a side cross section view of the exemplary embodiment of a dispensing valve shown in FIG. 5 mounted within a freezer door of the representative food processor.

In certain embodiments, for the ACSP to have access to the entire food flow path 102, fresh product mix interface adapter 162, such as the initial product feed hose, must be momentarily separated/released from product mix reservoir 164 (see FIG. 4). Separation of the fresh product mix interface adapter 162 may be done manually, or automatically. To accomplish manual separation, the Operator may remove or withdraw the fresh product mix interface adapter 162 from the product mix reservoir(s) 164 and then insert the fresh product mix interface adapter 162 into the automated reservoir 166, such as a spray booth 170. Spray booth 170 may include a tube inlet 168 designed to safely receive/house the fresh product mix interface adapter 162 for proper cleaning and sanitizing during the ACSP.

Figure 14:
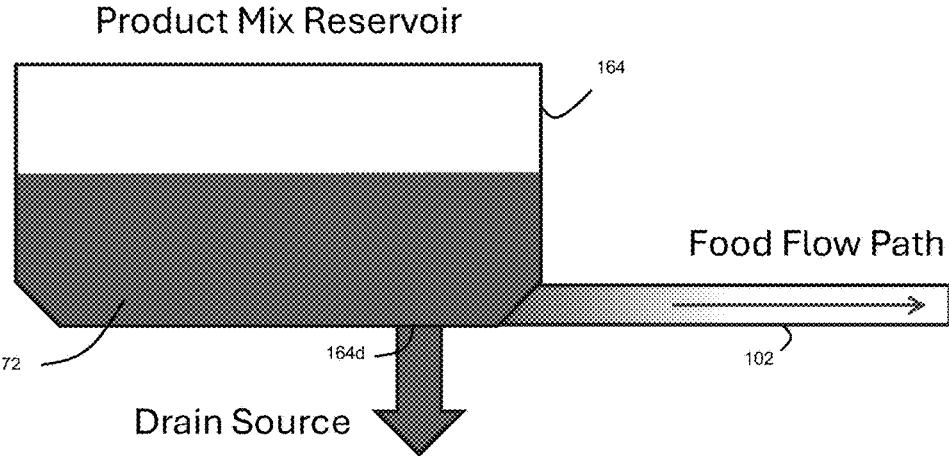
FIG. 14 is a schematic view of an exemplary embodiment of a product mix reservoir/spray booth configured for use within the food processor shown in FIG. 1.
Figure 14:
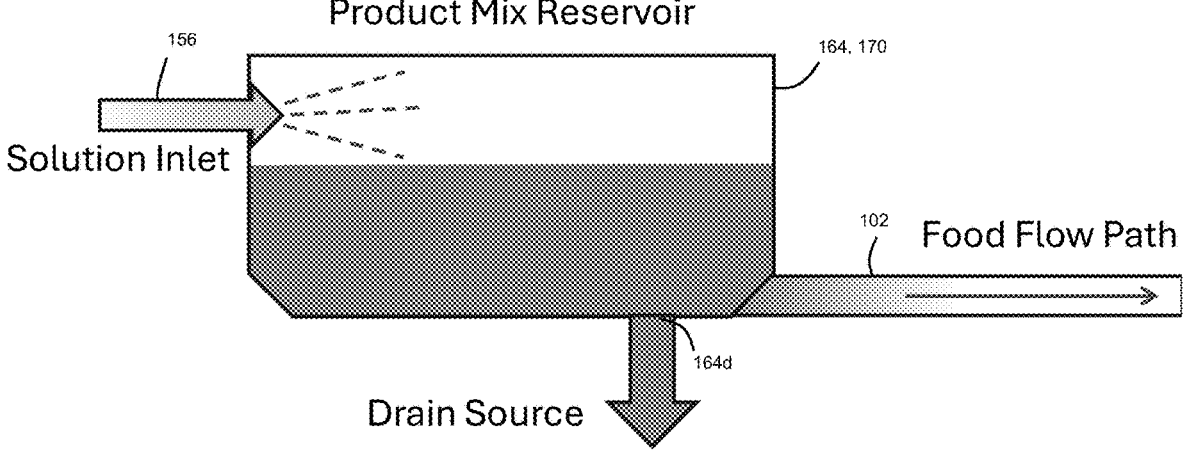

Alternatively, robotic and/or servo controllers may automatically transfer and/or isolate the product mix interface adapter 162 from the product mix reservoir(s) 164 according to the CIP integrated system. In a further embodiment shown in FIG. 14, the upstream product mix may also be isolated from the product mix reservoir 164 such that the product mix reservoir 164 itself may become the spray booth 170 and have the ability to automatically drain the product mix 142, such as via drain 164d, and clean, rinse and sanitize the product mix reservoir 164 as described above.

Figure 15:
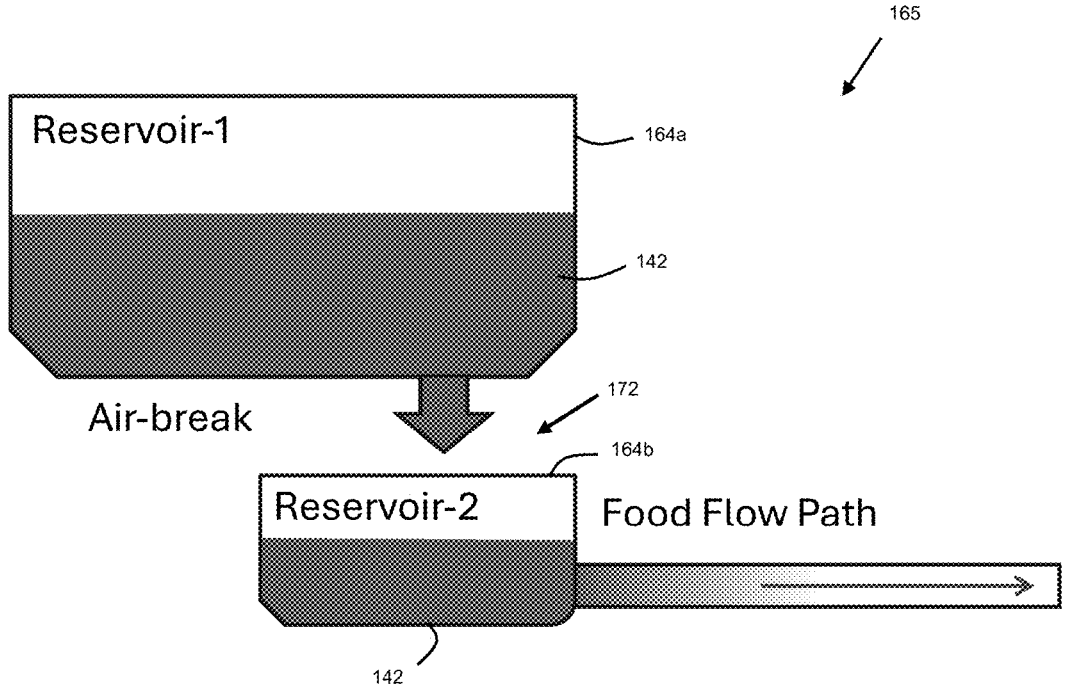
FIG. 15 is a schematic view of an exemplary embodiment of a two reservoir product mix reservoir/spray booth system configured for use within the food processor shown in FIG. 1.
Figure 15:
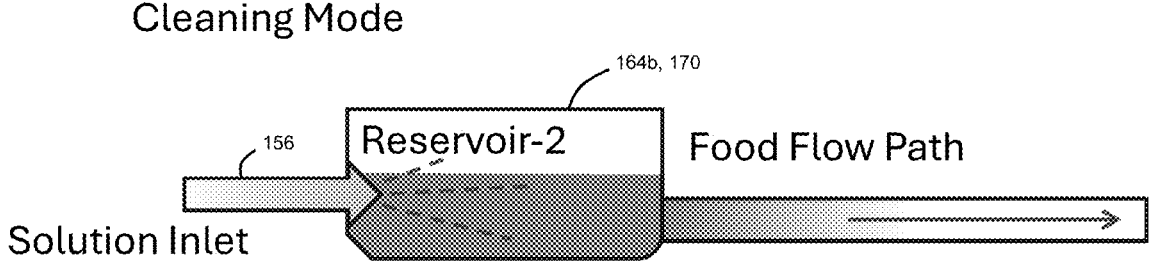

In still other embodiments, such as but not limited to mix reservoir system 165 shown in FIG. 15, the product mix reservoir 164 may comprise a first and second reservoir 164a, 164b defining an air gap 172 positioned therebetween. The main or primary product mix reservoir 164a may then feed product mix 142 to the secondary reservoir 164b, with the secondary reservoir 164b providing the product mix 142 to the food flow path 102 as described above. The secondary reservoir 164b may have a smaller volume than the primary reservoir 164a such that less product mix 142 is wasted or retreated during operation of the CIP system. The secondary reservoir 164b may also be convertible into the spray booth 170 for cleaning/sanitization.

Figure 13:
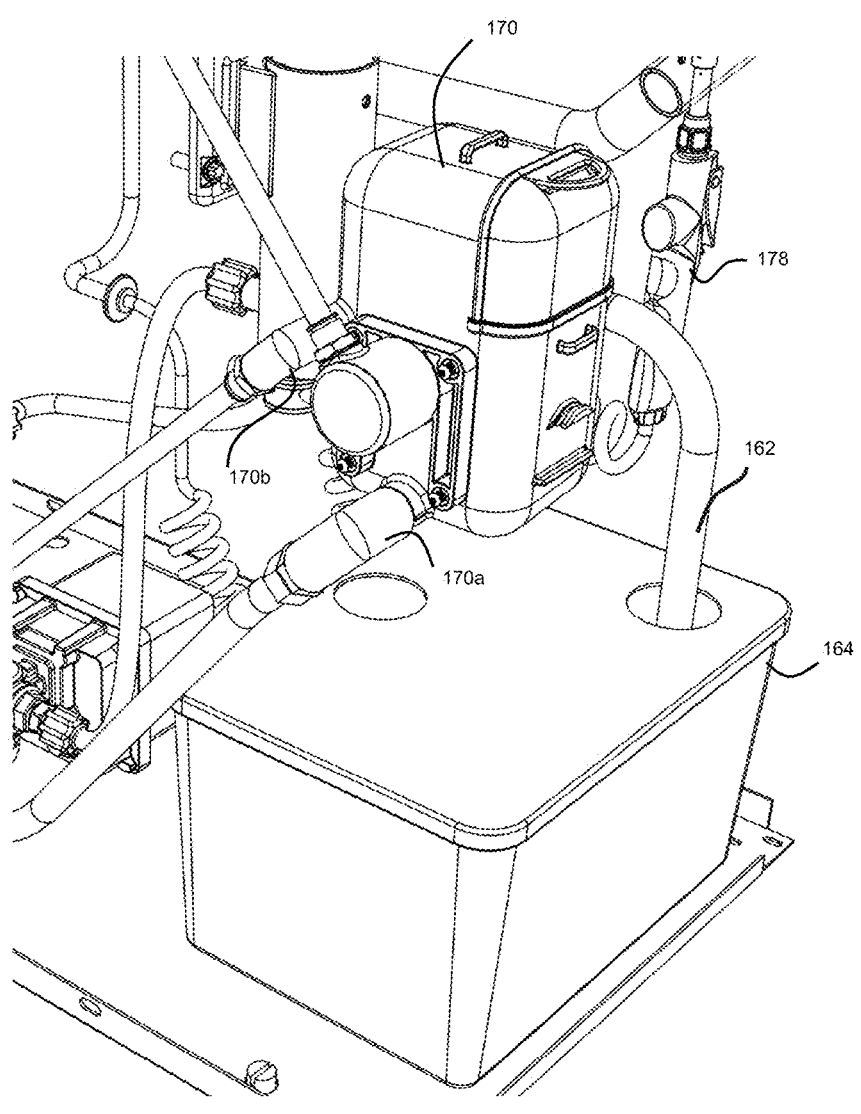
FIG. 13 is an expanded view of an exemplary embodiment of a spray booth configured for use within the food processor shown in FIG. 1.
Figure 17:
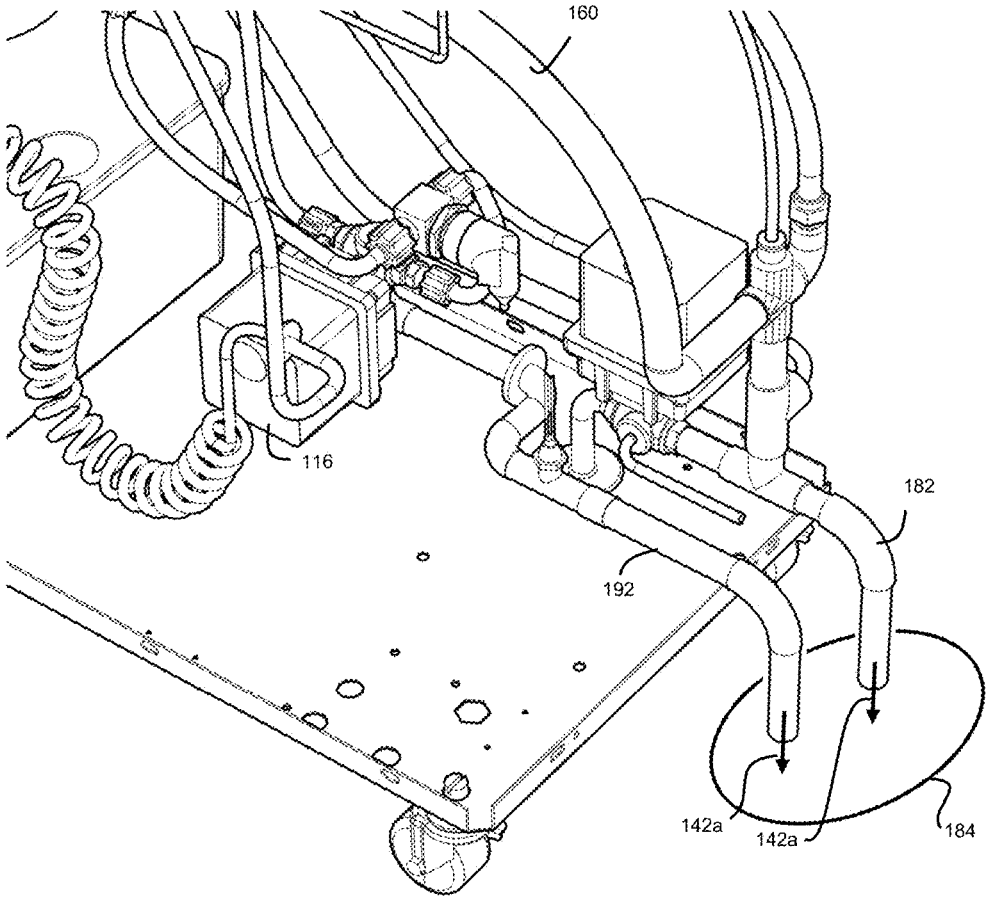
FIG. 17 is an expanded view of an exemplary embodiment of a drain system having both a passive drain and active drain configured for use within the food processor shown in FIG. 1.

In one aspect of the present invention, spray booth 170 capabilities may include, but are not limited to: automatic selective filling with freshwater, cleaner, and/or sanitizer. Spray booth 170 may also include one or more internal nozzles to jet/spray surfaces (not shown). As shown in FIG. 13, spray booth 170 may also include an active drain 170a to empty the spray booth 170 automatically via controller 146 as well as a passive overflow outlet 170b to regulate the volume of fluid within spray booth 170. Passive overflow outlet 170b may drain via passive drain line 182 (see FIG. 17, discussed below). Passive overflow outlet 170b may also prevent sealing of spray booth 170 such that spray booth 170 remains unpressurized during filling and removal of solutions therein and therefrom.

Figure 16:
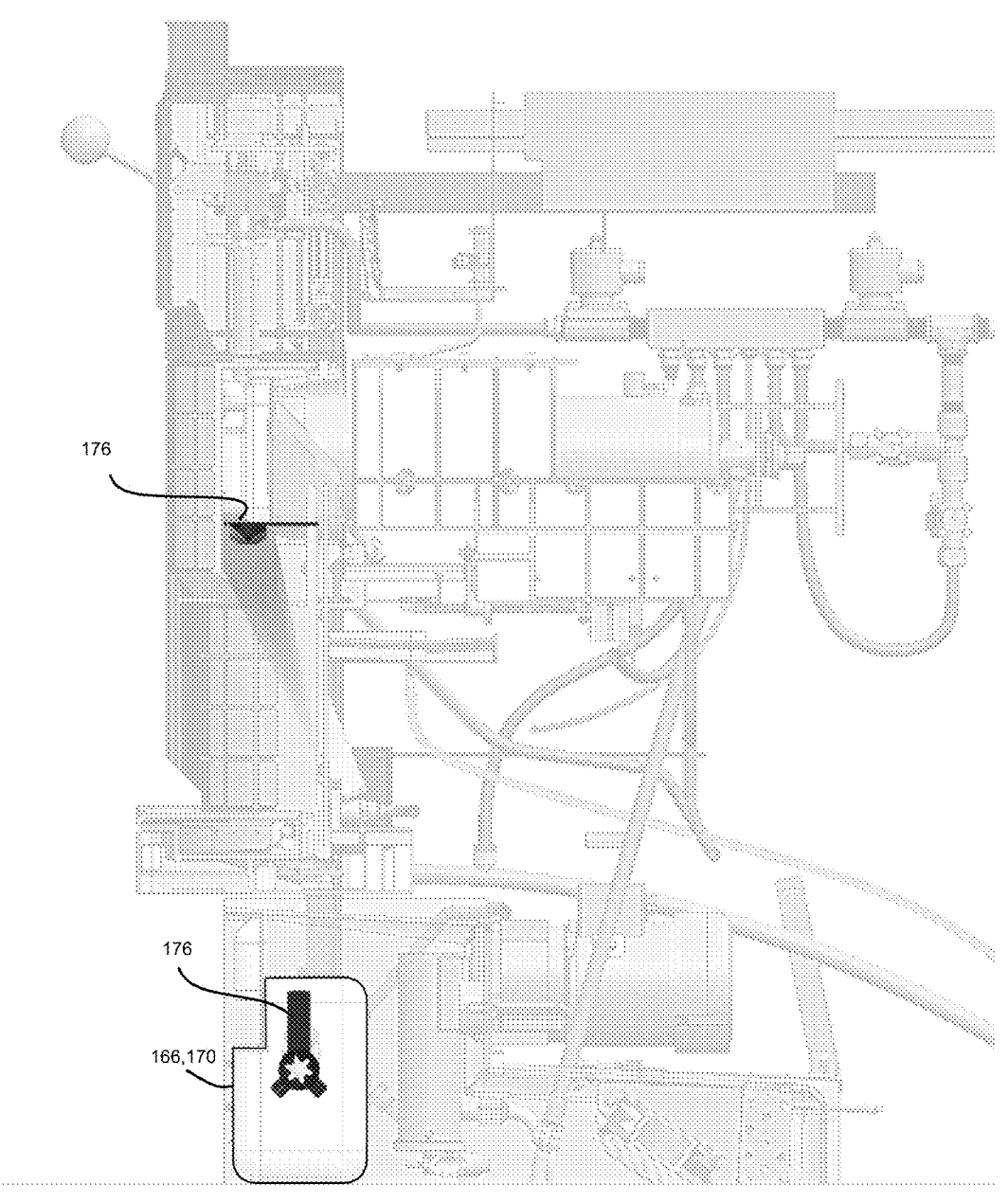
FIG. 16 shows an exemplary embodiment of a star cap and its cleaning within the exemplary spray booth.

Spray booth 170 may effectively clean and sanitize fresh product mix interface adapter 162, and/or other system components that are desired to be automatically cleaned and sanitized during the ACSP method, such as the removable star cap 176 (see FIG. 16), catch trays, and any separated mating surfaces. Spray booth 170 may also be a standalone feature, or releasably integral to the CIP system, and as described above, any reservoir connected to or directly within food flow path 102 may be converted to perform as a spray booth. In accordance with an exemplary embodiment, controller 146 or a similar controller maintains spray booth 170 throughout the ACSP and ensures that spray booth 170 is rinsed, cleaned, and sanitized appropriately as the ACSP and spray booth 170 transitions from one solution state to the next as described in greater detail below.

In a further aspect of the invention, the pre-ACSP and post-ACSP cycles may also include provision of a manually directed, e.g., hand-held, spray wand 178. Spray wand 178 may spray any fluid received from the CIP system including, but not limited to, freshwater, cleaner, and/or sanitizer. Spray wand 178 provides the operator with the flexibility to perform all necessary cleaning and sanitizing functions without ever leaving the proximity of food processor 100. For example, there are many external areas outside the scope of the internal CIP system, including the outer machine surfaces 100a that are outside of food flow path 102. These areas may still become covered with dried product mix and/or foreign matter over time and therefore should be periodically attended to keep the entire food processor clean and sanitized.

In an exemplary embodiment, once an ACSP has been initiated (step 410, 412), if the food processor was in either the "Auto Mode" (food processing and dispensing mode) or the "Standby Mode" (beater bars within freezer barrel 104 not actively or continuously agitating), that mode will be cancelled and the food processor will then be placed in "Wash Mode". In an exemplary embodiment, the Wash Mode may periodically aid with the ACSP throughout the entire cycle. In one aspect, the Wash Mode shall mean the machine state wherein the beater bar(s) within the freezer barrel 104 is configured to agitate, mix solutions, clean, and dispense frozen product mix during the ACSP cycle.

Returning to the drawings, a brief systems check 414 is performed for every initiated ACSP, such as to ensure that the input water pressure and temperature pass the system pre-check criteria. If the predetermined temperature and pressure values are not met, the ACSP will be abruptly aborted at step 416 and an error code will inform the operator accordingly at step 418. However, with a successful initialization step 420, and the food processor now in Wash Mode 422, the ACSP can proceed to the next step.

As described above, before full automation of the ACSP and depending on the level of the CIP design, the upstream food flow path 102b may need to be temporarily disconnected from the product mix reservoir(s) 164 if saving the unused product mix 142, otherwise the unused product mix 142 may be directed to waste. Again, the disconnecting/decoupling may happen automatically or manually by the operator. For manual decoupling (step 424), the operator will physically disconnect the product mix interface adapter 162 from the product mix reservoir(s)/product mix source(s) 164, rinse and clean accordingly with the spray wand 178 (Step 426), and then secure/insert the product mix interface adapter 162 into the spray booth 170 at step 428. Alternatively, during automatic operation (step 430), the product mix interface adapter 162 is managed accordingly, such as in certain embodiments, by releasing itself from the upstream food flow path 102. At step 428, in-line spray booth 170 may then manage the product mix interface adapter 162 throughout the ACSP. As mentioned, if the product mix reservoir 164 is converted to perform the spray booth functions, the product mix interface adapter 162 may not require separation.

Once the ACSP enters the "Fully Automated State", shroud 154 closes to envelope dispensing valve 122 and food product dispensing area 150 at step 432. The state of freezer barrel(s) 104 is then determined at step 434. That is, whether freezer barrel(s) 104 contains frozen product mix. By example and without limitation, frozen product mix is difficult to efficiently handle which can lead to an extended ACSP cycle time. Yet, when present, frozen product mix can also aid with the cleaning process in one of two ways. First, the frozen product mix may assist in dislodging product mix residue from internal and external components. This is achieved by extruding small, controlled portions of frozen product mix out of dispensing valve 122. Second, vacating small portions of product mix from the freezer barrel(s) allows for the introduction of warmer, less viscous medium to be added back in with the remaining frozen product mix still residing in the freezer barrel(s) i.e., freshwater may be added and mixed with the frozen product mix to form a less viscous product for easier flushing.

Returning to FIG. 12A, if frozen product mix 142 is initially detected inside the freezing barrel 104 (step 436), e.g., the measured temperature of the freezing barrel 104 is less than about 22-25° F. (−5.56--3.89° C.), food processor 100 will cycle controlled releases 438 of product mix 142 and freshwater 108 as discussed above until the temperature within freezer barrel 104 is measured to be above the threshold temperature 22-25° F. (−5.56--3.89° C.) at step 438a. Once the frozen product mix reaches a predetermined threshold temperature, 22-25° F. (−5.56--3.89° C.), solution transfer line 106 is brought into direct contact with a portion of the downstream food flow path 102c via interface port 112 at step 440. However, if the temperature of the product mix 142/freezer barrel 104 is initially detected as greater than the threshold temperature 22-25° F. (−5.56--3.89° C.) (step 442), step 438 may be omitted and ACSP may proceed directly to step 440. In an alternative embodiment, if a multi-port valve is positioned in the upstream portion of the food flow path and has access to a pressurized solution port, the freezing barrel temperature may be ignored and the product mix may be discharged out of the downstream outlet.

It should be noted that the above temperatures and temperature ranges are representative of one exemplary system and food product. Those skilled in the art should recognize that any suitable or desired temperatures may be employed in accordance with the teachings of the present invention. It should be further noted that while described as monitoring the temperature within the freezer barrel, those skilled in the art should recognize that any suitable phenomenon may be utilized to detect the transition of frozen food product into a less viscous slurry or liquid, such as but not limited to monitoring the drive current of the motor driving the beater bars within the freezer barrel.

With frozen product mix 142 removed and the solution transfer line 106 coupled to the food flow path 102, freezer barrel 104 may undergo an initial pre-clean at step 444. In one exemplary embodiment, the Wash Mode is momentarily disabled and the flowing medium is paused. The translatable solution transfer line 106 is removed and fully retracted from the downstream food flow path 102c and the freezer barrel 104 is then drained of all fluids, such as via through dispensing valve 122 at step 446.

In one aspect the translatable fluid transfer line interface port 112 can be fluidly connected to the food flow path 102 anywhere that allows for direct access to complete the CIP system. In another aspect the food flow path 102 is disrupted or otherwise rendered non-continuous by introduction of the solution transfer line interface port 112/dispensing valve 122. A flush of greater than about 3.0 GPM medium/solvent (e.g., freshwater, semi-solid, or gas) is then injected into food flow path 102 for a predetermined time to move/push the gray water/solution out of food flow path 102. In an alternative embodiment, if a multi-port valve is positioned in the upstream portion of the food flow path and has access to a pressurized solution port, the translatable fluid/solution transfer line may be completely retracted from the downstream food flow path to thereby allow the product mix to flow out the downstream outlet. An active, i.e. pump enabled, drain line 192 may collect all solutions and redirect the waste into an National Sanitation Foundation (NSF)-approved external drain source 184. See FIG. 17.

It should also be noted that if dispensing valve 122 or freezer door 124 is equipped with a star cap 176 used to dispense soft serve ice cream in its traditional star shaped pattern, star cap 176 may be manually or automatically removed/detached from dispensing valve 122/freezer door

124 for purposes of gaining full access to all of the food flow path surfaces for proper jetting/flushing with cleaner, freshwater rinse, and sanitizing.

In a further aspect of the exemplary embodiment, if the food processor is equipped with a catch/drip tray 158, the ACSP via controller 146 will automatically manage the tray 158 throughout the entire ACSP. By way of example and without limitation, any product mix residual that is present/dispensed onto drip tray 158 during the ACSP may be rinsed and cleaned via a periodic flow and/or jet spray of either freshwater, cleaner, or sanitizer. Drip tray 158 may be directly connected to a passive drain line such that all solutions are redirected into the NSF-approved external drain source 184. As a result, the passive drain line is cleaned and sanitized during the ACSP.

It should be further noted that in certain embodiments, cleaning of the passive drain line may also be managed without performing an ACSP by the food processor's user and/or OEM internal automated cleaning and sanitizing algorithms. Preprogramed sequences may perform cleaning, rinsing and sanitizing procedures to keep the food processor's drain line healthy during normal operation. A clean drain line mitigates the potential of harmful drain flies from cross contaminating finished products. It should be further noted that these internal cleaning procedures can also be manually enabled.

Once freezer barrel 104 has been fully drained, translatable solution transfer line 106 is then brought back into contact with or otherwise disrupts the downstream food flow path 102c. A cleaner solution may then be injected into the drained freezer barrel 104 at step 448, followed by placing the food processor back into Wash Mode for a predetermined or user/OEM selected period. The Wash Mode may then, at step 450, allow for agitation of the injected cleaner for removal of any remaining product mix from the internal components of the freezer barrel 104, e.g., the beater bar(s), shoe(s), bushing(s), scrapper blade(s), seal(s), gasket(s), O-ring(s), sensor(s), etc.

A final rinse of the freezer barrel 104 may immediately follow the pre-clean sequence (step 452). By way of example and without limitation a freshwater flush, such as greater than 3.0 GPM, may push the gray water/solution through freezer barrel 104 and out of all adjacent food flow paths 102a via active drain line 192. In accordance with an aspect of the invention, all solutions are redirected into the NSF-approved external drain 184. Moreover, if food processor 100 includes prime plug 140, driver 114 may locate prime plug 140 to the third, open position for a predetermined period which would allow residual gray water/solution to flow through the open prime port for purposes of flushing/removing any residual product mix 142 from prime plug 140.

Figure 18:
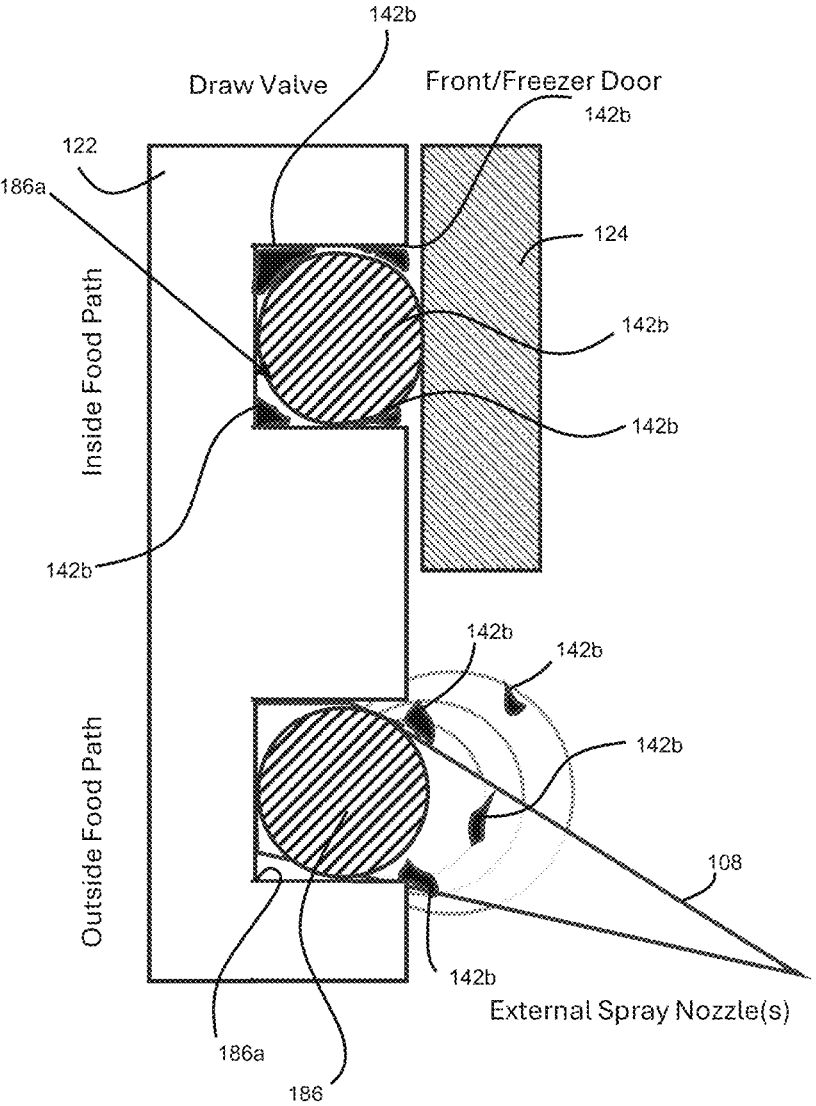
FIG. 18 is a schematic view showing cleaning of a decompressed seal in accordance with the present invention.
Figure 19:
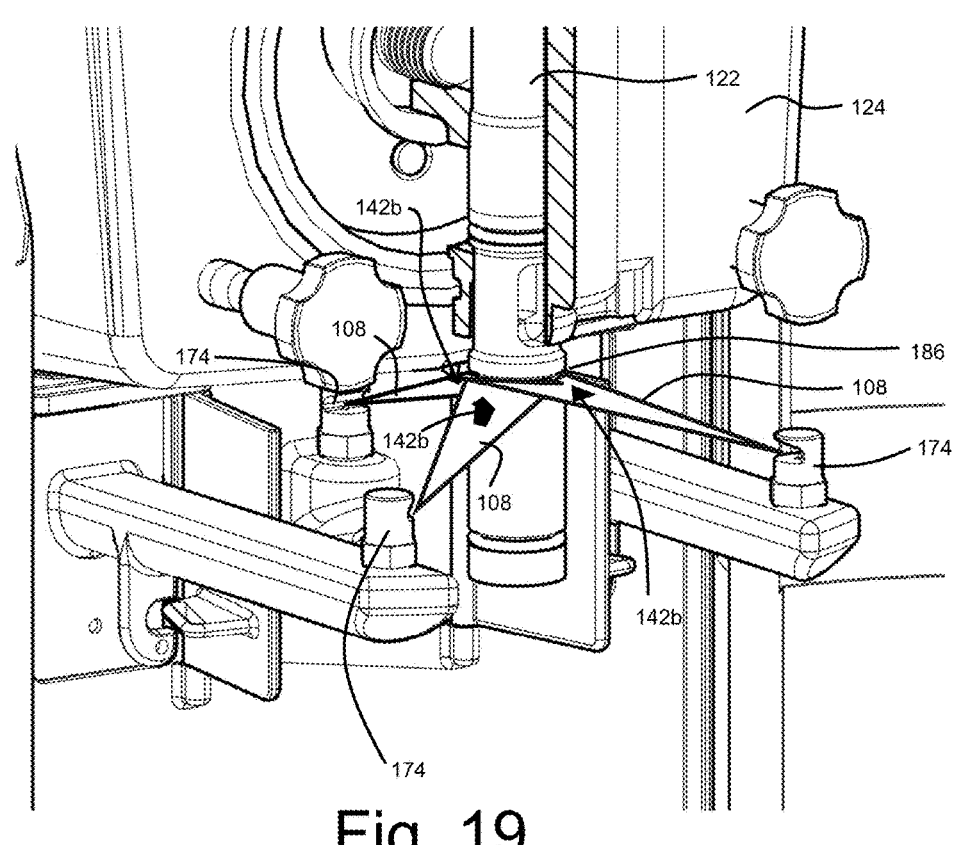
FIG. 19 is an expanded view showing a cleaning of a decompressed seal using an exemplary system of nozzles in accordance with the present invention.
Figure 20:
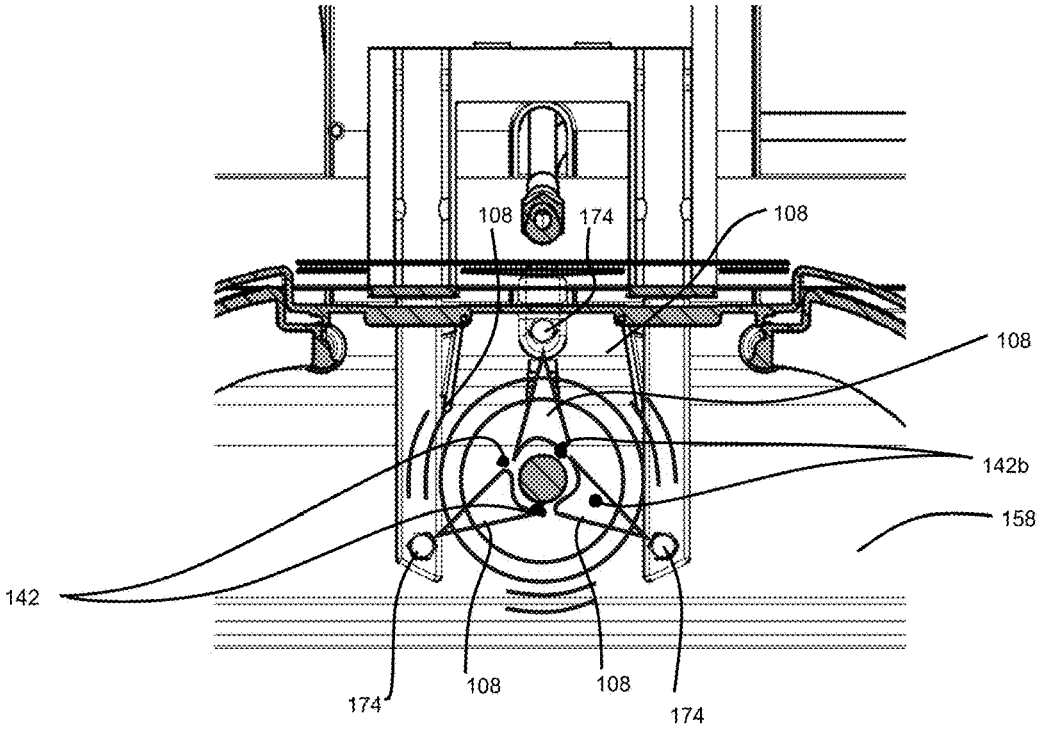
FIG. 20 is an expanded top view showing the cleaning of a decompressed seal using an exemplary system of nozzles.
Figure 21:
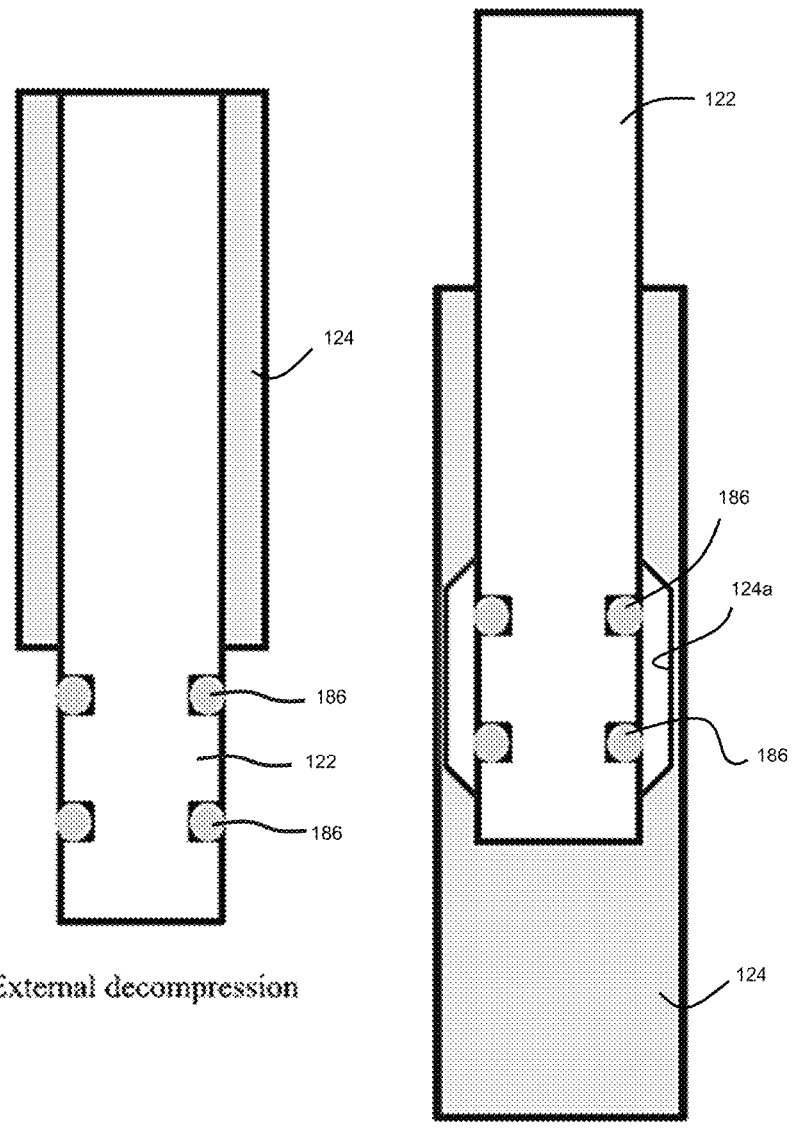
FIG. 21A is a schematic view showing external decompression of an O-ring seal.
FIG. 21B is a schematic view showing internal decompression of an O-ring seal.

With reference to FIGS. 18-20, following freezer barrel 104 final rinse is the rinsing and sanitizing of all downstream compressed O-ring/seal(s) 186 at step 454. The motivated freshwater received through sanitation line 106 is suspended at this time and the Wash Mode is momentarily disabled. The translatable solution transfer line interface port 112 may be moved into open space or another location via controller 146 and driver 114 so as to remove compressive forces upon the O-ring/seal(s) 186 at step 456, such as via external translocation of dispensing valve 122 relative to freezer door 124 (FIG. 21A) or translocation of dispensing valve 122 within a decompression chamber 124a defined within freezer door 124 (FIG. 21B). In a further aspect, prime plug(s) O-ring/seal(s) 188, if present on food processor 100, may be relocated to decompress the seals 188 and allow cleaning/sanitization of the O-ring(s) 188. In this manner, any compressed O-ring/seal(s) 186, 188 in the downstream food flow path 102c enter an uncompressed state for proper cleaning/sanitizing. It should also be noted that, if required, the compressed seal(s)/gasket(s) for the front/freezer door(s) 124 can also enter a decompressed state by the momentary repositioning of the front/freezer door(s) 124 during the cleaning/sanitizing state.

In one exemplary embodiment and without limitation thereto, while the translatable solution transfer line interface port 112 is automatically translating, such as traveling along its longitudinal axis, high-pressure jetted freshwater 108 may be directed at the O-ring seal(s) 186 via one or more nozzles 174, such as over 360° coverage at about 1.3 GPM. The freshwater flow may completely overwhelm the translatable solution transfer line interface port 112 (and prime plug 140 if present). The high-pressure freshwater jetting helps to dislodge residual product mix 142b out from between the exposed, uncompressed O-ring/Seals 186, 188 and their related grooves 186a on interface port 112/dispensing valve 122. This process continues for the application of sanitizer too, which immediately follows the freshwater rinse.

To fully drain the freezer barrel 104, the translatable solution transfer line interface port 112 is fully retracted from or reconstitutes the food flow path 102 such that the freezer barrel 104 is able to fully drain of solution. Once freezer barrel 104 is completely vacated, the translatable solution transfer line interface port 112 may then be brought back into or otherwise disrupt the downstream food flow path 102c whereby the freezer barrel 104 may then be filled with sanitizer at step 460. The sanitizer may also flow through the prime plug port, if present, for a predetermined time for the purpose of sanitization. Once the freezer barrel 104 has reached the appropriate volume of sanitizing solution, the prime plug 140 will automatically move to the closed position and the motivated sanitizing solution will continue to flow through the freezer barrel(s) into all adjacent food flow paths, including any multiport valves 116 inclusive to the food flow path 102, for the purpose of sanitization. Food processor 100 may be placed into Wash Mode for a predetermined period to agitate the sanitizer to ensure that all surfaces within the freezer barrel 104 is fully exposed to the solution at step 462. In an exemplary embodiment the sanitizer may reside within the food flow path 102 for a minimum two-minute contact time for proper sanitation efficacy.

The translatable solution transfer line interface port 112 then fully retracts from the downstream food flow path 102c to allow the final food flow path sanitizer solution to drain from freezer barrel 104 at step 464. Additionally, all sanitizing solution residing within any portion of the food flow path 102 will also be drain from the CIP system through the active 192 and/or passive 182 drain lines into NSF-approved external drain 184 (see FIG. 17). It should be noted that, in one embodiment, the sanitizing solution may be NSF D-2 Listed such that a final freshwater rinsing of the food flow path 102 is not required before reintroduction of the food product 142. A final freshwater rinse 466 may be required for alternative sanitizers that are not NSF D-2 listed. With the final wash being completed interface port 112 is withdrawn from food flow path 102 (step 468) and product mix interface adapter 162 is removed from spray booth 170 and remounted within product mix reservoir 164 at step 470. Shroud 154 is then opened and the ACSP is completed at step 472.

All external surfaces surrounding the downstream portion of the food flow path 102c may also receive a final sanitizing and rinse, such as the ACSP overspray barriers (shroud 154 exterior), front/freezer door(s) 124, adjacent food processor face surfaces 100a, drip/catch tray(s) 158, etc. Additionally, if the sanitizer does not require a final freshwater rinse (i.e., is NSF D-2 listed), the food processor face surfaces 100a and catch/drip trays 158 may still receive a final water rinse to minimize any potential foam residual. The operator may also have the option to use the handled spray wand 178 to perform a final cleanup. If the food processor is equipped with a star cap, the cap may be manually or automatically returned to its default position at the terminal end of the food flow path.

Figure 3:
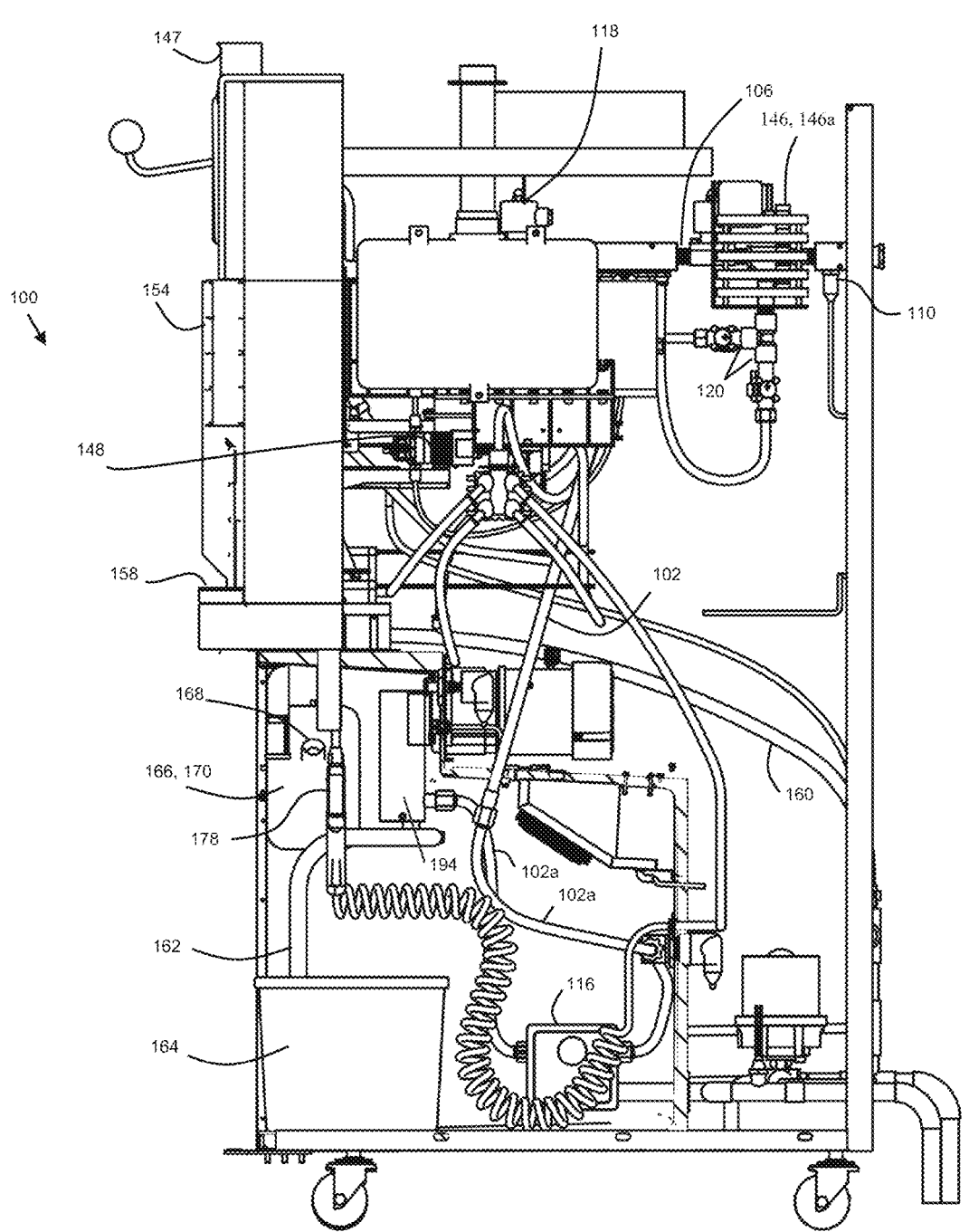
FIG. 3 is a right plan view of the exemplary embodiment of a representative food processor shown in FIG. 1 with the side panel removed.

In still further embodiments, and as shown in FIGS. 3 and 4, food processor 100 may be equipped with a product mix pump 194 having an inlet end coupled to product mix reservoir via intake hose and an outlet end coupled to freezer barrel 104 via product mix line 102a. During an ACSP, operation of product mix pump 194 may be under the operational control of controller 146 or other dedicated controller hardware executing ACSP software protocols. As discussed above, the intake hose is removed from the product mix reservoir and inserted into the spray booth. Product mix pump 194 may then receive an appropriate solution via the spray booth 170 (and/or another upstream solution source). Depending upon where within the ACSP protocol, product mix pump 194 draws in the solution (e.g., freshwater, cleaner, sanitizer) from spray booth 170 and discharges the solution into all adjacent product mix lines 102a comprising the food flow path 102 accordingly. Spray booth 170 may then drained of the current solution (i.e., freshwater) and refilled via controller 146 with the next solution (e.g., a cleaner) required to perform the step in the ACSP.

It should be noted that if the food processor is equipped with a product mix pump 194, in a further exemplary embodiment the product mix pump 194 and its associated food flow paths may be isolated from the rest of the food flow paths 102 that are associated with the freezer barrel 104. Separating the various portions of the food flow path may allow parallel sanitizing of both the freezer barrel 104 and the pump 194. It should be further noted that the sanitizer may be provided to the pump 194 via the spray booth 170.

In one aspect of the invention these solutions, i.e. freshwater, cleaner, sanitizer, etc., will also be drawn into and through the pump 194 and any adjacent food flow paths accordingly to perform steps like rinsing, cleaning, and sanitizing of the spray booth 170 itself and the pump 194. All solutions are redirected through the active drain line 192, preferably into the NSF-approved external drain source 184. In another aspect, the pump 194 can be managed sequentially or in parallel to the overall food flow path 102. In a further aspect, the pump 194 can be managed independently of the food flow path 102 for post-processing, such as, being an integrated component of the product mix packaging, removable for post-processing, or disengaged to allow maximum flow from the upstream food flow path.

From the above discussion, for those embodiments where food processor 100 is a dispensing freezer producing frozen food product, such as soft serve ice cream, it should be noted that the possibility of accidentally introducing cleaning or sanitizing solution into the food product is eliminated through stacking of safety redundancies. For instance, and without limitation, the dispensing valve would have to be fluidly connected to the sanitation line and lowered by the driver such that fluid could flow into the freezer barrel. Each valve within the sanitation pathway would have to be open and the cleaning solution pump would have to be active and pumping solution. Moreover, the freezer barrel would have to be depressurized sufficiently to allow cleaning fluid to enter the freezer barrel. That is, during normal operation the freezer barrel is pressurized by frozen food product such that any opening or leak into the freezer chamber would result in frozen food product escaping the freezer barrel and not cleaning solution entering the barrel. But should the freezer barrel be so depressurized, the food processor would recognize this "error" state and prevent dispensing of any food product. As a result of these many redundancies, the likelihood of serving a consumer food product contaminated with cleaners and/or sanitizers is minimal.

In still another aspect of the invention, the pump 194 may be configured to selectively operate as a traditional pump with controlled, pressurized flow of fluid through the pump, but may also be operated in a pump bypass mode whereby the pumping mechanism is dissociated from the fluid flow path whereby pressurized fluid may pass through the pump unhindered and at high flow rates.

The invention has been described in detail with particular reference to a presently preferred embodiment, but it will be understood that variations and modifications can be affected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

The invention claimed is:

1. A food processor comprising:
   (a) a food flow path extending from a food flow path input to a food flow path output, wherein food product passes in a first direction along the food flow path from a first portion of the food flow path to a second portion of the food flow path, the food flow path having a freezer chamber, the freezer chamber having an inlet and an outlet;
   (b) a solution transfer line connected to a source of pressurized solution, the solution transfer line including an interface port translatable between a transferring position fluidly connected to the food flow path and a storage position fluidly independent of the food flow path; and
   (c) a valve located outside of the food flow path and fluidly intermediate the source of pressurized solution and the interface port, the valve moveable between a closed position inhibiting flow through the valve and an open position permitting flow of the pressurized solution through the valve to the interface port.

2. The food processor of claim 1, further comprising a first controller operably connected to at least one of the interface port and the valve, the first controller configured to dispose the valve in the open position and the interface port in the storage position.

3. The food processor of claim 2, wherein the first controller is operably connected to both the interface port and the valve.

4. The food processor of claim 1, further comprising a) a first controller operably connected to the interface port, the first controller configured to dispose the interface port in at least one of the transferring position and the storage position, and b) a second controller operably connected to the valve, the second controller configured to selectively dispose the valve in at least one of the open position and the closed position.

5. The food processor of claim 1, wherein the valve is located in the solution transfer line.

6. The food processor of claim 1, wherein a controller includes a driver connected to the interface port to selectively translate the interface port to one of the transferring position and the storage position.

7. The food processor of claim 1, further comprising a driver connected to the solution transfer line to move the interface port to the transferring position.

8. The food processor of claim 1, wherein a pressurized solution from the source of pressurized solution flows in either the first direction or in a second direction opposite the first direction.

9. The food processor of claim 1, further comprising a dispensing valve in the food flow path, the dispensing valve configured to selectively permit the food product to pass from the food flow path.

10. The food processor of claim 9, wherein the dispensing valve is selected from the group consisting of a draw valve, a ball valve, a spigot, a plunger, and a cock valve.

11. The food processor of claim 10, wherein the food processor defines a food product dispensing area beneath the dispensing valve, and wherein the food processor further includes a shroud movable between a dispensing position wherein the dispensing valve is accessible to dispense the food product and a cleaning position wherein the shroud encompasses the dispensing valve and a portion of the pressurized solution is configured to wash the dispensing valve.

12. The food processor of claim 11, wherein the food processor further includes a drip tray located below the dispensing valve and the shroud, wherein the drip tray is configured to receive waste food product from the dispensing valve when the shroud is in the dispensing position, and the portion of the pressurized solution when the shroud is in the cleaning position.

13. The food processor of claim 12, wherein the food processor further includes a drip tray drain line wherein the drip tray drain line is configured to be flushed by the portion of the pressurized solution.

14. The food processor of claim 1, further comprising a pressure sensor in the food flow path.

15. The food processor of claim 1, further comprising a prime plug, the prime plug moveable to a first position exposing a portion of the food flow path to an atmospheric pressure, a second position isolating the food flow path from the atmospheric pressure, and a third position locating a portion of the prime plug external to the food flow path.

16. The food processor of claim 15, further comprising a driver connect to the prime plug to move the prime plug between the first position, the second position, and the third position.

17. The food processor of claim 16, wherein the driver is a longitudinal gear rack.

18. The food processor of claim 15, wherein the dispensing valve includes a priming orifice configured to selectively operate as the prime plug.

19. The food processor of claim 1, further comprising an active drain line selectively connectable to the food flow path and a passive drain line selectively connectable to the food flow path, the active drain line connected to a pressure source, wherein the active drain line and the passive drain line are configured for simultaneous and independent flow through.

20. The food processor of claim 19, wherein the pressure source is a higher than an ambient/atmospheric pressure source.

21. The food processor of claim 19, further comprising a temperature sensor configured to monitor a temperature in one of the active drain line and the passive drain line.

22. The food processor of claim 1, further comprising a controller operably connected to the solution transfer line and configured (i) to impart flow in the solution transfer line with the interface port in the transferring position and (ii) to impart fluid pressure within the solution transfer line with the interface port in the storage position.

23. A food processor comprising:

(a) a food flow path extending from a food flow path input to a food flow path output, wherein food product passes in a first direction along the food flow path from an upstream portion of the food flow path to a downstream portion of the food flow path, the food flow path having a freezer chamber, the freezer chamber having an inlet and an outlet;

(b) a source of pressurized solution;

(c) a solution transfer line connected to the source of pressurized solution, the solution transfer line including an interface port moveable between a transferring position wherein the solution transfer line is fluidly connected to the food flow path and a storage position wherein the solution transfer line is fluidly independent of the food flow path;

(d) a valve located outside of the food flow path and coupled to the solution transfer line intermediate the source of pressurized solution and the interface port, the valve moveable between a closed position inhibiting flow of the pressurized solution through the valve and an open position permitting the flow of the pressurized solution through the valve;

(e) a driver connected to the interface port to selectively translate/move the interface port to the transferring position wherein the solution transfer line is fluidly connected to the food flow path; and (f) a controller connected to i) the valve, and ii) at least one of the driver and the interface port, wherein the controller is configured to position the valve in the open position and the interface port in each of the transferring position and the storage position.

* * * * *